United States Patent

Maruyama et al.

Patent Number: 5,978,520
Date of Patent: Nov. 2, 1999

[54] METHOD OF RECOGNIZING IMAGE DATA AND APPARATUS THEREFOR

[75] Inventors: Kishiko Maruyama, Kokubunji; Shigeru Shimada, Kodaira; Yoshinori Takahara, Oosaka; Atsushi Matsumoto, Sapporo; Kazuhiro Hiraki, Fukuoka, all of Japan

[73] Assignees: Hitachi, Ltd.; Hitachi Software Engineering Co., Ltd, both of Tokyo, Japan

[21] Appl. No.: 08/687,937

[22] Filed: Jul. 29, 1996

[30] Foreign Application Priority Data

Jul. 31, 1995 [JP] Japan ................................. 7-194451

[51] Int. Cl.[6] ......................................................... G06K 9/32
[52] U.S. Cl. .......................... 382/294; 382/113; 382/195; 382/197; 382/199; 382/200; 382/201; 382/203; 382/266; 382/316
[58] Field of Search ..................................... 382/113, 197, 382/199, 200, 266, 316, 202, 203

[56] References Cited

U.S. PATENT DOCUMENTS

| | | | |
|---|---|---|---|
| 4,843,630 | 6/1989 | Catros et al. | 364/414 |
| 5,278,922 | 1/1994 | Takasaki et al. | 382/60 |
| 5,339,366 | 8/1994 | Tanaka et al. | 382/22 |
| 5,412,742 | 5/1995 | Takasaki et al. | 382/60 |
| 5,467,411 | 11/1995 | Tanaka et al. | 382/1 |
| 5,537,490 | 7/1996 | Yukawa | 382/60 |
| 5,579,468 | 11/1996 | Miyauchi et al. | 395/152 |

OTHER PUBLICATIONS

"Sequencial thinning algorithm and level assigning using inclusion relation" pp. 9–16, by Takeshi Agui, et al (PRL81–37) (1981).

"Extraction of Contour Lines Using Neighboring Relationships Based on Voronoi–Line Graph" pp. 1499–1506 by Norio Mizutani, et al vol.J74–D–11 No.11 (1991).

"Parallel Search for Feature Extraction with Concurrent Objects" pp. 65–78, by Yuichi Nakamura, et al (1993).

"A Multi–Agent System for Extracting Characters from Document Images" pp. 21–26 by Keiji Gyohten, et al.

*Primary Examiner*—Christopher S. Kelley
*Assistant Examiner*—Sheila Chawan
*Attorney, Agent, or Firm*—Antonelli, Terry, Stout & Kraus, LLP

[57] ABSTRACT

An object of the present invention is to generate a vector or data from inputted drawing data interactively by suppressing the input cost.

When an unknown process occurs in the system during data processing, an inquiry to a user is generated in the case of interactive operation. However, when drawings are handled, the number of inquiries to a user increases and the system operability lowers inversely. The present invention executes the drawing recognition method by cooperation and and competition of a multi-agent on the basis of the basic property of a figure such as adjacent relation. When blurring or a problem portion such as in interruption part or a junction part appears during recognition of a drawing, the linkage relation of line paths is automatically decided by making the recognition agent adjacent to the problem portion cooperate and compete. An inquiry to a user is not made. By doing this, vector data is obtained.

The input cost of figure information in a data base can be reduced remarkably.

14 Claims, 24 Drawing Sheets

| PARAMETER | 730 |
|---|---|
| RADIUS OF THE CIRCLE | R |
| DISTANCE BETWEEN FOCUSES | $L_1$ |
| SIZE OF THE ELLIPSE | $L_2$ |
| COST FUNCTION (SMOOTHNESS) | $D_1$ |
| DIFFERENCE BETWEEN COST FUNCTIONS | $D_2$ |

FIG. 8

RECOGNIZED LINE PATHS

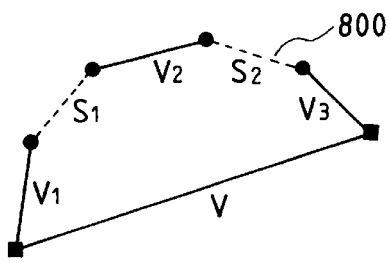

- ■ TERMINAL POINT OF A LINE PATH
- ● CHARACTERISTIC POINT OF A LINE PATH
- ─── VECTOR (i = 1, n)  $V_i$
- ----- GAP (j = 1, m)  $S_j$

| FEATURE MEASUREMENTS | BASIC PROPERTY | |
|---|---|---|
| (1) DISTANSE/PATH LENGTH BETWEEN START AND TERMINAL POINTS $$C_1 = V / \left( \sum_{i=1}^{n} V_i + \sum_{j=1}^{m} S_j \right)$$ | MEANDERED ($C_1 \leq \alpha$) | 810 |
| (2) TOTAL SUM OF VECTOR LENGTHS/PATH LENGTH $$C_2 = \sum_{i=1}^{n} V_i / \left( \sum_{i=1}^{n} V_i + \sum_{j=1}^{m} S_j \right)$$ | INDICATED BY A SOLID LINE ($C_2 \leq \beta$) | 820 |
| (3) PATH LENGTH $$C_3 = \sum_{i=1}^{n} V_i + \sum_{j=1}^{m} S_j$$ | LENGTH OVER AN EXTENT ($C_3 \leq \gamma$) | 830 |

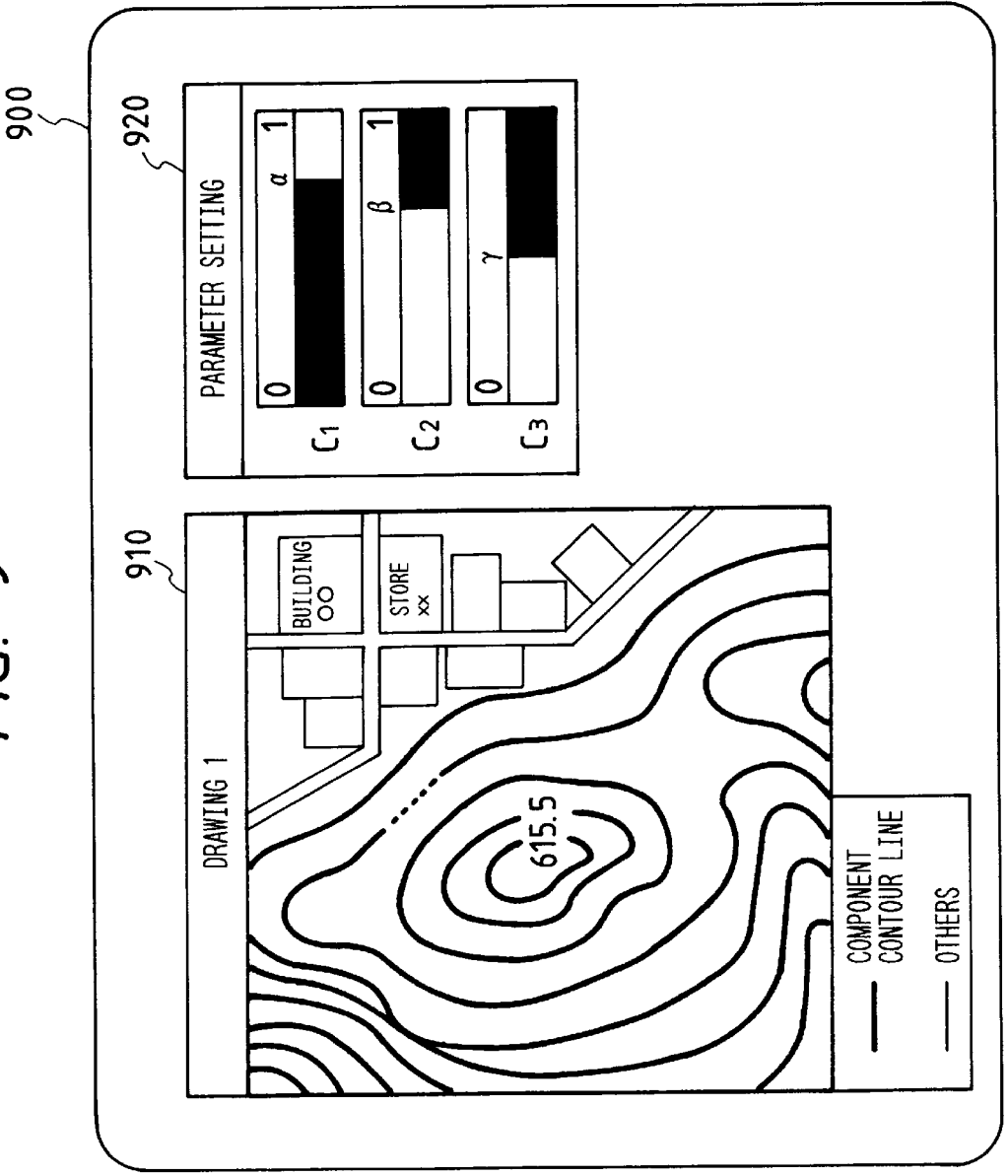

— VORONOI-LINE GRAPH

FIG. 14(a)
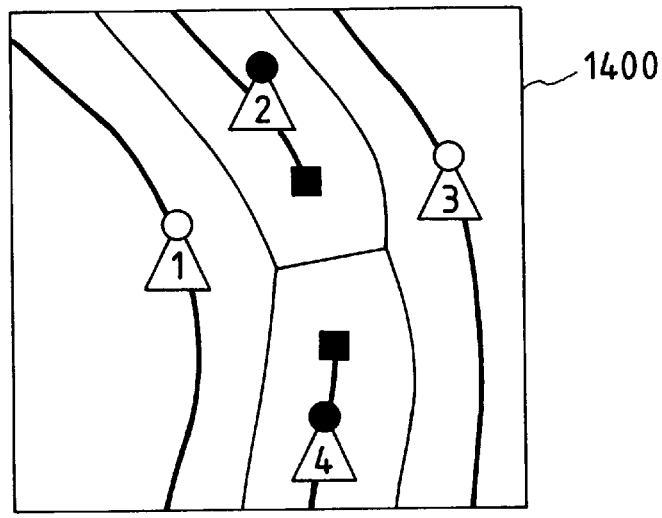
FIG. 14(b)
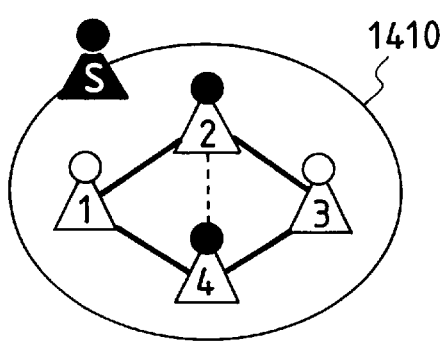
FIG. 14(c)
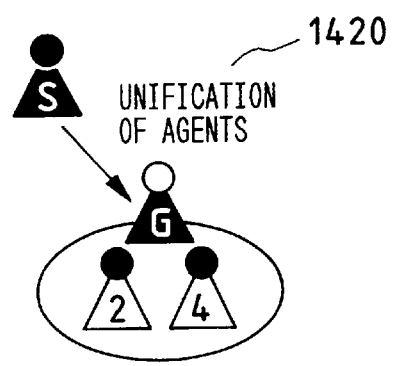
FIG. 14(d)
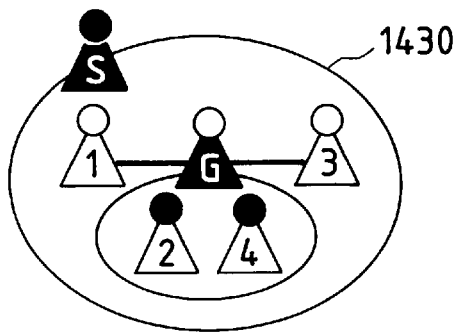
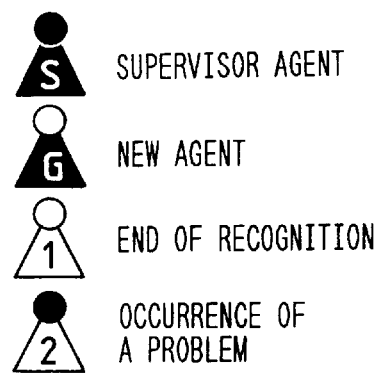

FIG. 15(a)
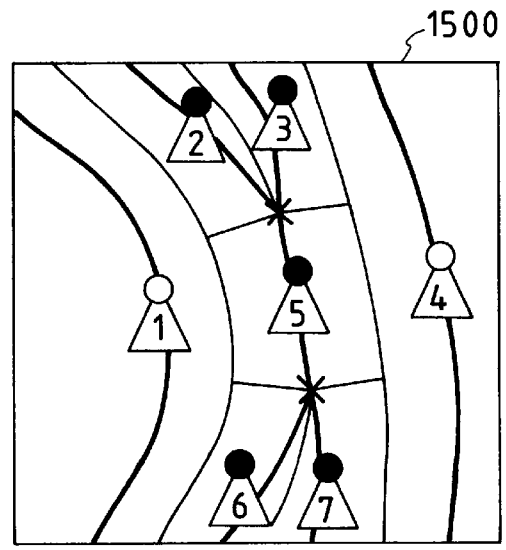
FIG. 15(b)
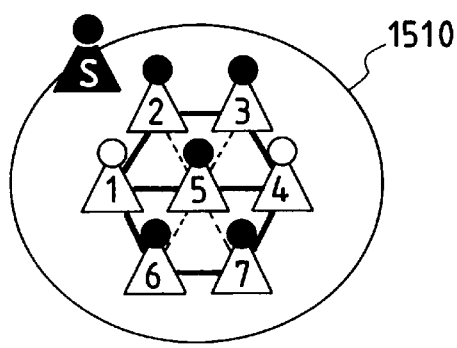
FIG. 15(c)
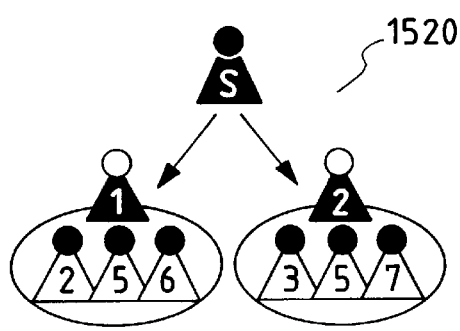
UNIFICATION
OF AGENTS
FIG. 15(d)
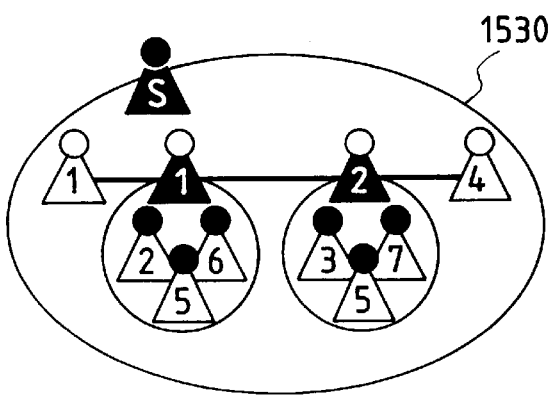
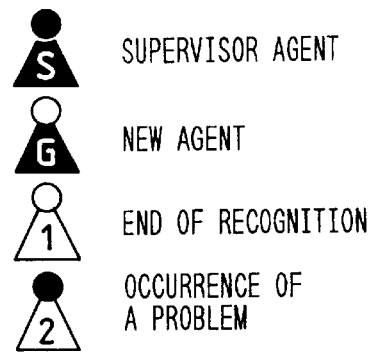

FIG. 16(a)
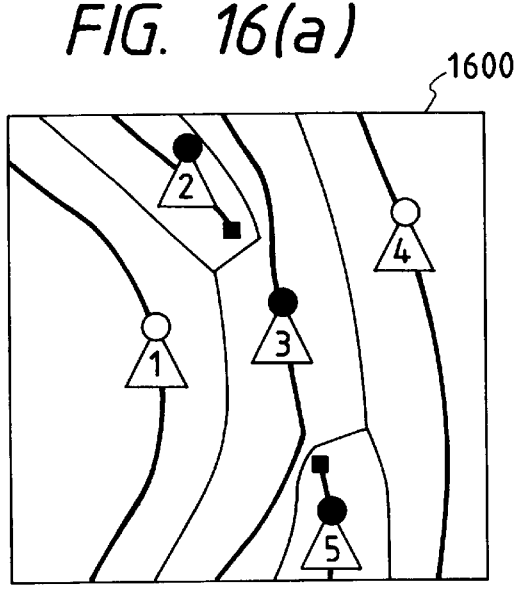
FIG. 16(b)
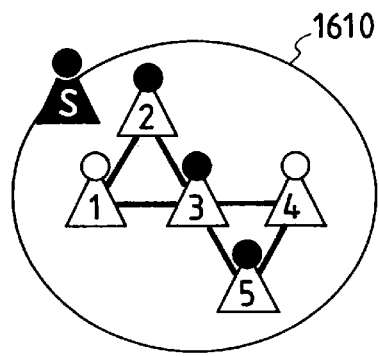
FIG. 16(c)
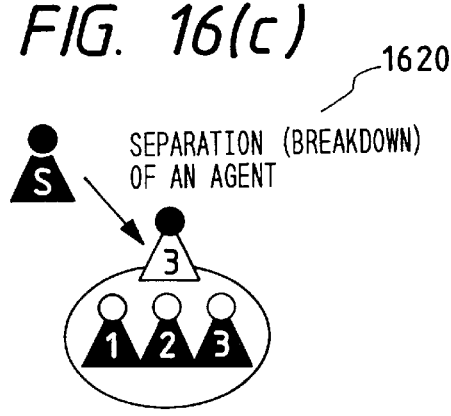
SEPARATION (BREAKDOWN) OF AN AGENT
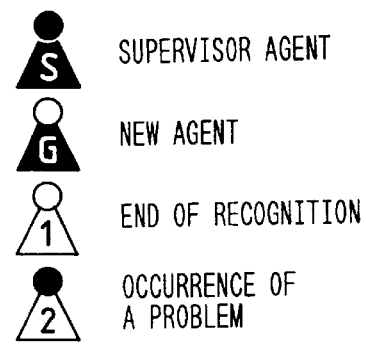
- SUPERVISOR AGENT
- NEW AGENT
- END OF RECOGNITION
- OCCURRENCE OF A PROBLEM
FIG. 16(d)
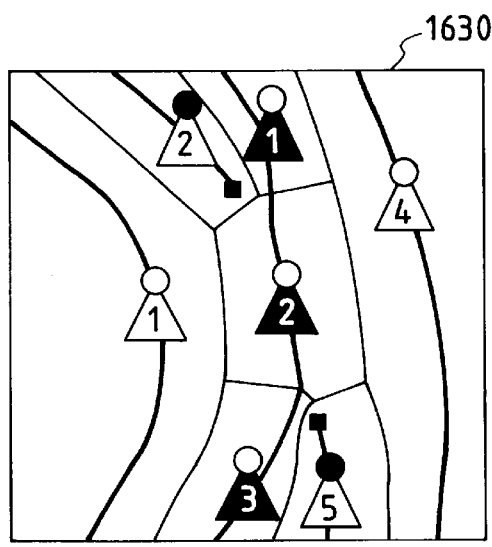
FIG. 16(e)
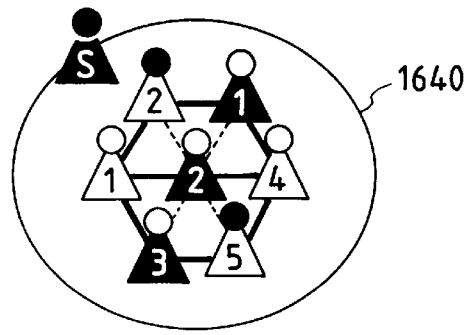

FIG. 20(a)

VECTOR TRACING AGENT: VTAi (i=1~N)

| | | |
|---|---|---|
| FUNCTION DEFINITION | (1) OBTAIN A PATH OF A CONTOUR LINE BY VECTOR TRACING, EXTRACT CHARACTERISTIC POINTS, AND STORE THE POSITION COORDINATE<br>(2) WHEN A JUNCTION PART OR AN INTERRUPTION PART IS MET IN THE COURSE OF TRACING, IF THERE IS A RECOGNIZED TRACING PATH IN THE ADJACENT VTA, GENERATE A PATH WITH THE TRANCING PATH AS A CRITERION<br>(3) IF THERE IS NO RECOGNIZED TRACING PATH, SUSPEND THE PROCESS AND WAIT UNTIL THE ADJACENT TRACING PATH IS RECOGNIZED<br>(4) WHEN GENERATE A NEW PATH, CONFIRM THAT THERE IN NO CONTRADICTION AS A CONTOUR LINE | 2001 |
| PREMISE DEFINITION | (1) VTAs ARE GENERATED AS MUCH AS N IN CORRESPONDENCE WITH N TRACE BASE POINTS WHICH ARE CROSSING POINTS BETWEEN TRACE TAG LINES SPECIFIED BY AN OPERATOR AND CONTOUR LINE COMPONENTS<br>(2) THE GENERATED NVTAs BECOME EXTINCT AT THE STAGE OF RECOGNITION OF PATHS OF CORRESPONDING N CONTOUR LINES | 2002 |

FIG. 20(b)

SUPERVISOR AGENT: SA

| | | |
|---|---|---|
| FUNCTION DEFINITION | (1) CONTROL GENERATION AND EXTINCTION OF VTAs, AND MONITOR THE WHOLE BEHAVIOR<br>(2) WHEN VTAi MEETS A JUNCTION PART OR AN INTERRUPTION PART, ADJACENT VTAi+1 AND VTAi-1 ARE RESPONDED TO A QUIERY FROM VTAi | 2003 |
| PREMISE DEFINITION | KEEP EXISTING TILL EVERY PROCESS IS OVER, REGARDLESS OF GENERATION AND EXTINCTION OF A SERIES OF VTA | 2004 |

FIG. 21

| JUNCTION PART | (1) SA RESPONDS ADJACENT $VTA_{i+1}$ AND $VTA_{i-1}$ TO $VTA_i$<br><br>(2) $VTA_i$ EXAMINES WHETHER PATHS OF ADJACENT $VTA_{i+1}$ AND $VTA_{i-1}$ ARE RECOGNIZED OR NOT<br><br>(3) WHEN RECOGNIZED, $VTA_i$ PREDICTS A PATH BASED UPON THE ADJACENT PATH INFORMATION<br><br>(4) $VTA_i$ CHECKS WHETHER THE PREDICTED PATH IS ON A BLACK COMPONENT OF CONTOUR LINE FIGURE, AND CORRECTS IF NOT | 2101 |
|---|---|---|
| INTERRUPTION PART | (1) SA RESPONDS ADJACENT $VTA_{i+1}$ AND $VTA_{i-1}$ TO $VTA_i$<br><br>(2) $VTA_i$ EXAMINES WHETHER PATHS OF ADJACENT $VTA_{i+1}$ AND $VTA_{i-1}$ ARE RECOGNIZED OR NOT<br><br>(3) WHEN RECOGNIZED, $VTA_i$ PREDICTS A PATH BASED UPON THE ADJACENT PATH INFORMATION<br><br>(4) $VTA_i$ CHECKS WHETHER THE PREDICTED PATH CROSSES ANOTHER PATH, AND CORRECTS WHEN CROSSES | 2102 |

— RECOGNIZED VECTOR
— UNRECOGNIZED VECTOR
● CURRENT POINT
■ TERMINAL POINT
○ RECOGNIZED CHARACTERISTIC POINT
□ TRACE AREA
---- BASE LINE

OBTAIN THE SHORTEST DISTANCE d FROM THE TERMINAL POINT $P_5$, WITH RESPECT TO ADJACENT AND ALREADY RECOGNIZED (i+1)TH CONTOUR LINE

PARALLELLY SHIFT CONSTITUENT VECTORS OF (i+1)TH CONTOUR LINE BY A DISTANCE d, AND PUT IT AS A BASE LINE

FIG. 24

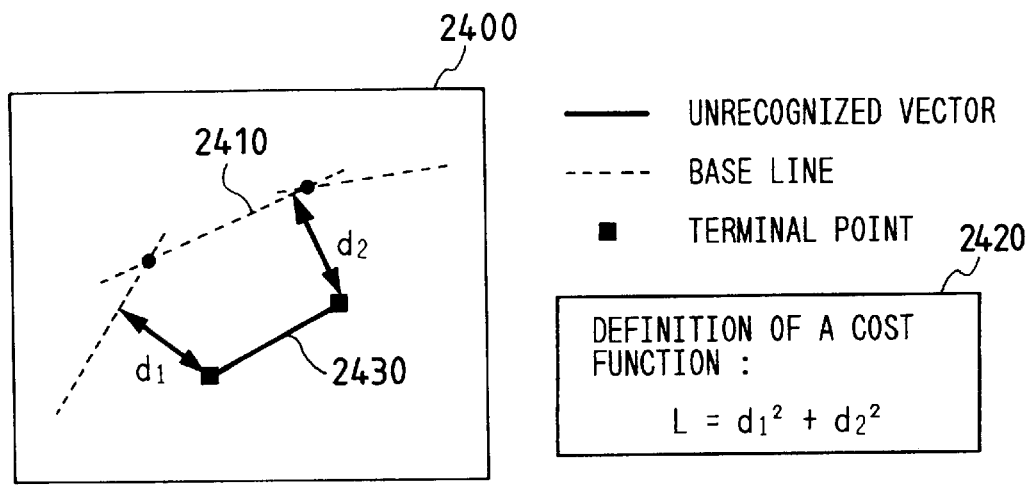

— UNRECOGNIZED VECTOR
---- BASE LINE
■ TERMINAL POINT

DEFINITION OF A COST FUNCTION :
$$L = d_1^2 + d_2^2$$

FIG. 25

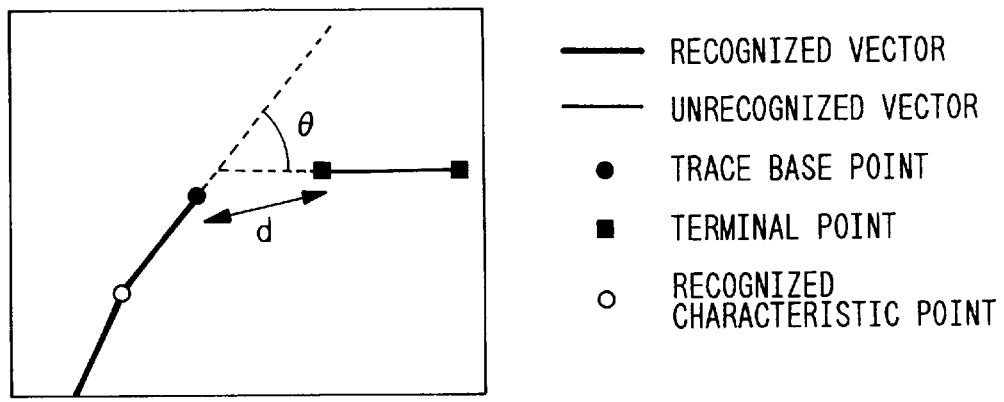

— RECOGNIZED VECTOR
— UNRECOGNIZED VECTOR
● TRACE BASE POINT
■ TERMINAL POINT
○ RECOGNIZED CHARACTERISTIC POINT

CONDITIONS OF A PATH IS JUDGED AS SATISFIED,
IN CASE THE NEXT TWO CONDITIONS ARE SATISFIED :
(1) CORRESPONDENCIES AMONG VECTORS ARE SECURED
(2) A DISTANCE d BETWEEN TERMINAL POINTS,
    AND AN ANGLE θ BETWEEN VECTORS ARE WITHIN
    SPECIFIED REGIONS

FIG. 26(a)

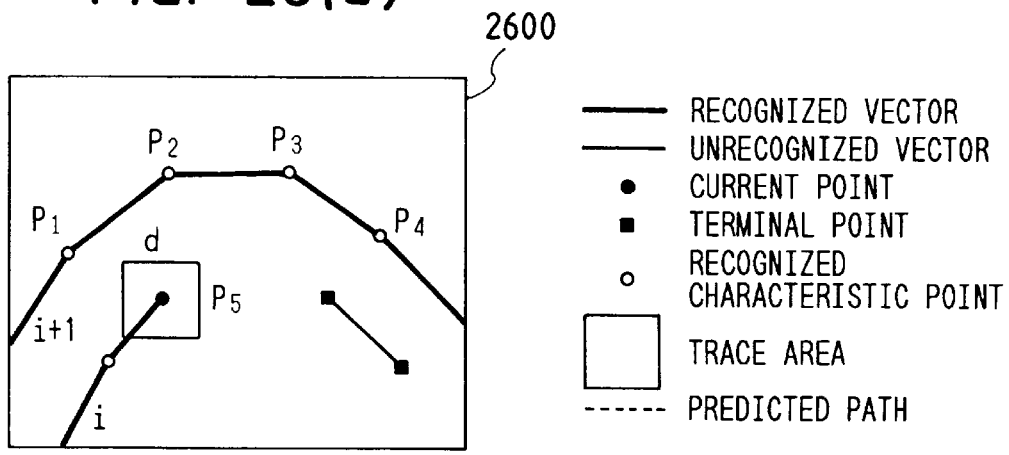

- RECOGNIZED VECTOR
- UNRECOGNIZED VECTOR
- • CURRENT POINT
- ■ TERMINAL POINT
- ○ RECOGNIZED CHARACTERISTIC POINT
- □ TRACE AREA
- ----- PREDICTED PATH

FIG. 26(b)

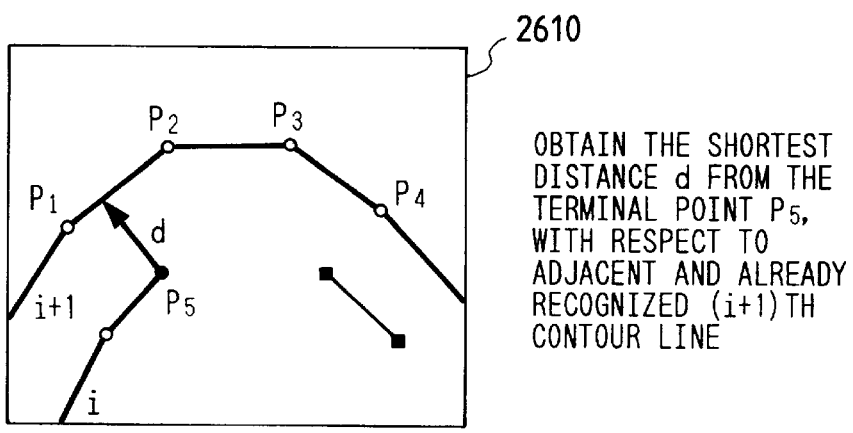

OBTAIN THE SHORTEST DISTANCE d FROM THE TERMINAL POINT $P_5$, WITH RESPECT TO ADJACENT AND ALREADY RECOGNIZED (i+1)TH CONTOUR LINE

FIG. 26(c)

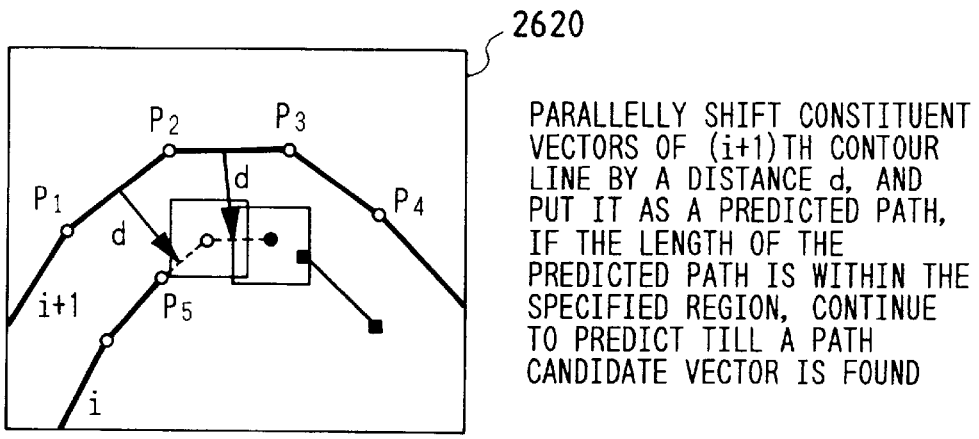

PARALLELLY SHIFT CONSTITUENT VECTORS OF (i+1)TH CONTOUR LINE BY A DISTANCE d, AND PUT IT AS A PREDICTED PATH, IF THE LENGTH OF THE PREDICTED PATH IS WITHIN THE SPECIFIED REGION, CONTINUE TO PREDICT TILL A PATH CANDIDATE VECTOR IS FOUND

METHOD OF RECOGNIZING IMAGE DATA AND APPARATUS THEREFOR

BACKGROUND OF THE INVENTION

1. Field of the Invention

The present inventions relates to a drawing registration method of registering a drawing contained in a map or a drawing described by a photo-electro transfer device such as a scanner or TV camera in a data base and more particularly to a drawing recognition method valid in recognizing and registering a drawing indicated by a group of a plurality of similar lines such as contour lines.

2. Description of the Prior Art

As a conventional drawing recognition method, many preceding researches on automatic input of information of contour lines have been reported. For example, in Reference 1: Agui and 2 others, "Research on mountainous geographical map information" (Electric Communication Society Report, PRL81-37, 1981), a method of performing the thinning process for a mountainous geographical map image to be inputted, extracting a contour line candidate from decision of whether it is a long vector component or not, and connecting the contour line candidate interrupted by characters and symbols mutually on the basis of the vector angle is proposed. However, this method causes a problem that since the decision of vector angle is local, many connection errors occur.

On the other hand, in Reference 2: Mizutani and 3 others, "Extraction of contour lines using the adjacent relation by a Voronoi-line graph" (Technical Report of the Institute of Electronics, Information and Communication Engineers, D-II, Vol. 1, J74-D-II, No. 11, 1991), a method of preparing a Voronoi-line graph so as to grasp the global adjacent relation of line segments, obtaining an adjacent graph between these line segments, and connecting the interrupted contour component lines correctly is proposed. This method reduces connection errors from decision of the adjacent graph. However, in a portion where contour lines are crowded in a narrow area and jointed as a drawing or a portion where lines are interrupted by numeric characters indicating elevation and cliff symbols, it is impossible to recognize contour lines perfectly and many recognition errors occur. Therefore, when automatic recognition using the aforementioned batch processing input method is performed, a concentrated error check is often requested to an operator. This concentrated error check requires enormous labor, so that a problem arises that the entire cost from input to output for the system will not reduce.

Therefore, as shown in Reference 3: Yamakawa and 1 other, "Interactive drawing input system" (Nikkei Computer Graphics, April issue, 1987, pp. 120 to 130), a man-machine based automatic recognition method in which decision of an operator is reflected positively from the initial stage of vectorization is widely noticed. In this man-machine based automatic recognition method, when the vectorization direction is not automatically decided, the vectorization direction is decided by an inquiry to an operator from the system, so that an unnecessary operation required for error check can be cut down. However, since the system is structured so that whenever a portion where the tracing direction is not automatically decided such as a junction part or an interruption part of contour lines appears, the tracing direction, that is, the vectorization direction is inquired, the burden imposed on an operator (user) is severe.

On the other hand, separately from this flow, many researches on recognition of the whole by describing a drawing to be traced structurally according to the relation between the whole and the parts and confirming the consistency between parts traced successively have been reported. For example, in Reference 4: Nakamura and 1 other, "Extraction of image characteristics by parallel trace" (Artificial Intelligence Society Journal, Vol. 8, No. 1, pp. 65 to 78, 1993), it is proposed to realize characteristic extraction on the basis of this structure description by a cooperative action of a multi-agent. This method enables to decide a process dynamically at execution time without detailed description on the processing flow and highly precise image recognition by self-adjusting problem solving is expected. However, in this method, there is a possibility that an enormous calculation time is required due to an explosive increase of combinations. Furthermore, in a drawing having a complicated shape such as contour lines, structure description itself is not clear. Therefore, the present invention proposes a method of constituting a system with a recognition agent for recognizing a path in correspondence to a plurality of adjacent lines designated by an operator one by one and a supervisor agent for supervising the whole as application of the multi-agent theory to drawing recognition. This method enables highly precise recognition by describing an autonomous action of each agent and a cooperative action between the agents. However, when two agents are set in correspondence to one contour line due to incorrect assignment of agents, a problem arises that an incorrect recognition result is obtained because the cooperative action between the agents is not performed correctly. To realize highly precise recognition by a cooperative action of a multi-agent, an art for automatically changing assignment of agents so as to set agents correctly is important.

As an example in which changing of agent assignment is realized, Reference 5: Gyoten and 3 others, "Multi-agent system for separation of characters from a document image" (Technical Report of the Institute of Electronics, Information and Communication Engineers, AI95-37, PRU 95-152, pp. 21–26) may be cited. In this reference, the spatial distributed method in the multi-agent theory is applied to a problem of separation of characters in a document image and one agent is set in correspondence to one character string in the document image. However, character separation and drawing recognition are different in the recognition object, so that the agent assignment used for character recognition and the assignment error detection method cannot be used for the drawing as they are.

Description of an autonomous action of each agent and a cooperative action between the agents enables highly precise recognition. However, when two agents are set in correspondence to one contour line due to incorrect assignment of agents or agents are set in correspondence to a component other than contour lines, a problem arises that an incorrect recognition result is obtained because the cooperative action between the agents is not performed correctly.

SUMMARY OF THE INVENTION

An object of the present invention is to provide a drawing registering method and apparatus therefor for performing the drawing recognition process correctly on the basis of a sure result of a recognition which is an already completed recognition automatically registering the result in the data base when a portion where originally continuous lines are discontinuous and a portion where a plurality of originally independent lines are connected (hereinafter called problem portions) are automatically interpolated and one drawing is recognized as one continuous vectorized data due to restrictions (resolution, comments, etc.) on indication of a drawing when a drawing on a map or a drawing is registered as vectorized data.

Another object of the present invention is to provide a drawing registering method and apparatus therefor for assigning a recognition agent to a drawing before path interpolation, canceling incorrect assignment between the recognition agents recognizing the path to be interpolated, and executing automatic recognition and registration of drawings.

To accomplish the above objects, the apparatus inputs a drawing indicated by lines on a paper drawing into a computer as binary image data, generates first vectorized data by the thinning vectorization process, and assigns agents to the components of the first vectorized data. When the agent encounters the problem portion when it recognizes the corresponding vectorized data, the apparatus interpolates the vectorized data of the problem portion by referring to the adjacent vectorized data, recognizes the obtained series of vectorized data as one drawing data, and registers it as second vectorized data. Furthermore, the apparatus judges whether the agent assignment is correct or not on the basis of the basic property of figure such as the adjacent relation so that the agent assigned to the first vectorized data has a one-to-one correspondence with the drawing data to be recognized. When the agent assignment is incorrect, the apparatus changes the agent assignment by unifying or separating the agents so the contradiction corresponding to the basic property of figure is canceled. At initial assignment of agents, it is possible to recognize the line paths on the entire drawing on the basis of the local connection and assign agents in correspondence to each of the recognized line paths. A figure to be recognized may be contour lines extracted from an image.

Still further advantages of the present invention will become apparent to those of ordinarily skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 8 is an illustration for the classification method of line paths.

FIG. 9 is a display screen when parameters are set in the automatic extraction process of contour component lines.

FIG. 14 (a)–FIG. 14 (d) are illustrations for the unification process of recognition agents in an interruption part.

FIG. 15 (a)–FIG. 15 (d) are illustrations for the unification process of recognition agents in a junction part.

FIG. 16 (a)–FIG. 16 (e) are illustrations for the separation process of recognition agents in a junction part.

FIG. 20 (a)–FIG. 20 (b) are drawings showing function definitions and preconditions of an autonomous action of agents.

FIG. 21 is a drawing showing actual processing contents of a cooperative action between agents.

FIG. 24 is an illustration for the process of selecting a most suitable path candidate on the basis of the base line.

FIG. 25 is an illustration for the path decision process of a selected path candidate vector.

FIG. 26 (a)–FIG. 26 (c) are illustrations for the method of predicting a path on the basis of path information of adjacent contour lines in an interruption part.

DESCRIPTION OF THE PREFERRED EMBODIMENTS

An embodiment of the present invention will be explained hereunder using an example of recognizing contour lines in a contour map.

(1) Entire system

Figure 1:
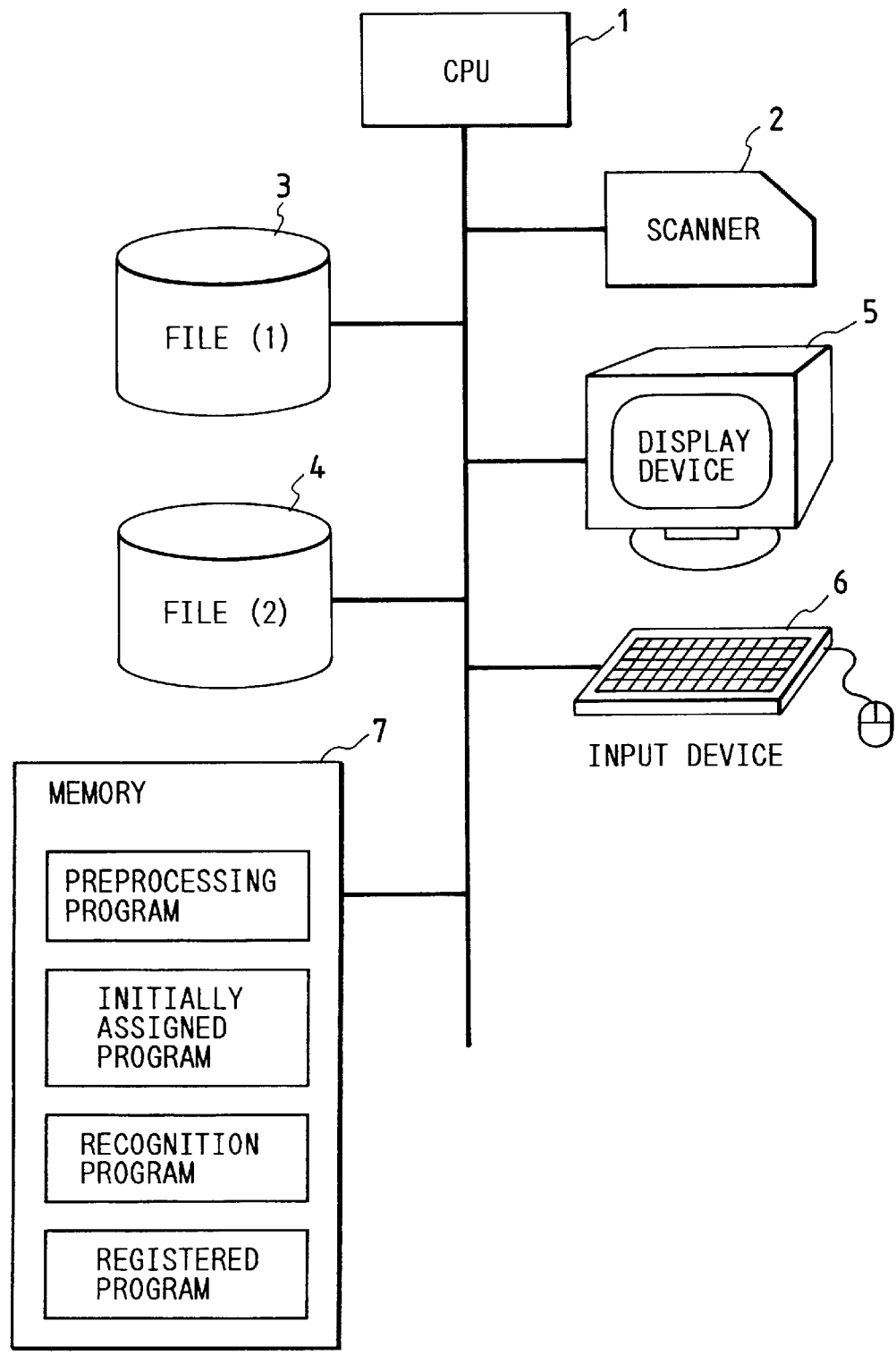
FIG. 1 is a drawing showing the system configuration of the present invention.

FIG. 1 is a drawing showing the system configuration for recognizing lines in the present invention. Numeral 1 indicates a central processing unit (CPU) for controlling the system such as recognition and vectorization of lines. Numeral 2 indicates an image input device for reading a map or drawing as binary image data. For example, a scanner may be cited. Numeral 3 indicates a first file for storing binary image data obtained by the scanner. Numeral 4 indicates a second file for storing vectorized data obtained by performing a preprocess for the binary image data stored in the first file. The preprocess executed here indicates a process of extracting at least two characteristic points (bending point and terminal point) representing binary image data, obtaining position coordinates of those points, and vectorizing them sequentially. Numeral 5 indicates a display device for displaying a line image or a figure with binary image data read by the scanner, vector data obtained by the preprocess, and vector data after the recognition process. Numeral 6 indicates an input device for inputting an instruction for an operation of this system. Numeral 7 indicates a memory having programs describing the preprocess, recognition process, and others executed by the CPU 1 and a storage area used for processing. The files (1) and (2) and the memory 7 may be installed inside or outside the system. The files (1) and (2) and the memory 7 may be unified with a large memory and distinguished by division of use areas.

Figure 2:
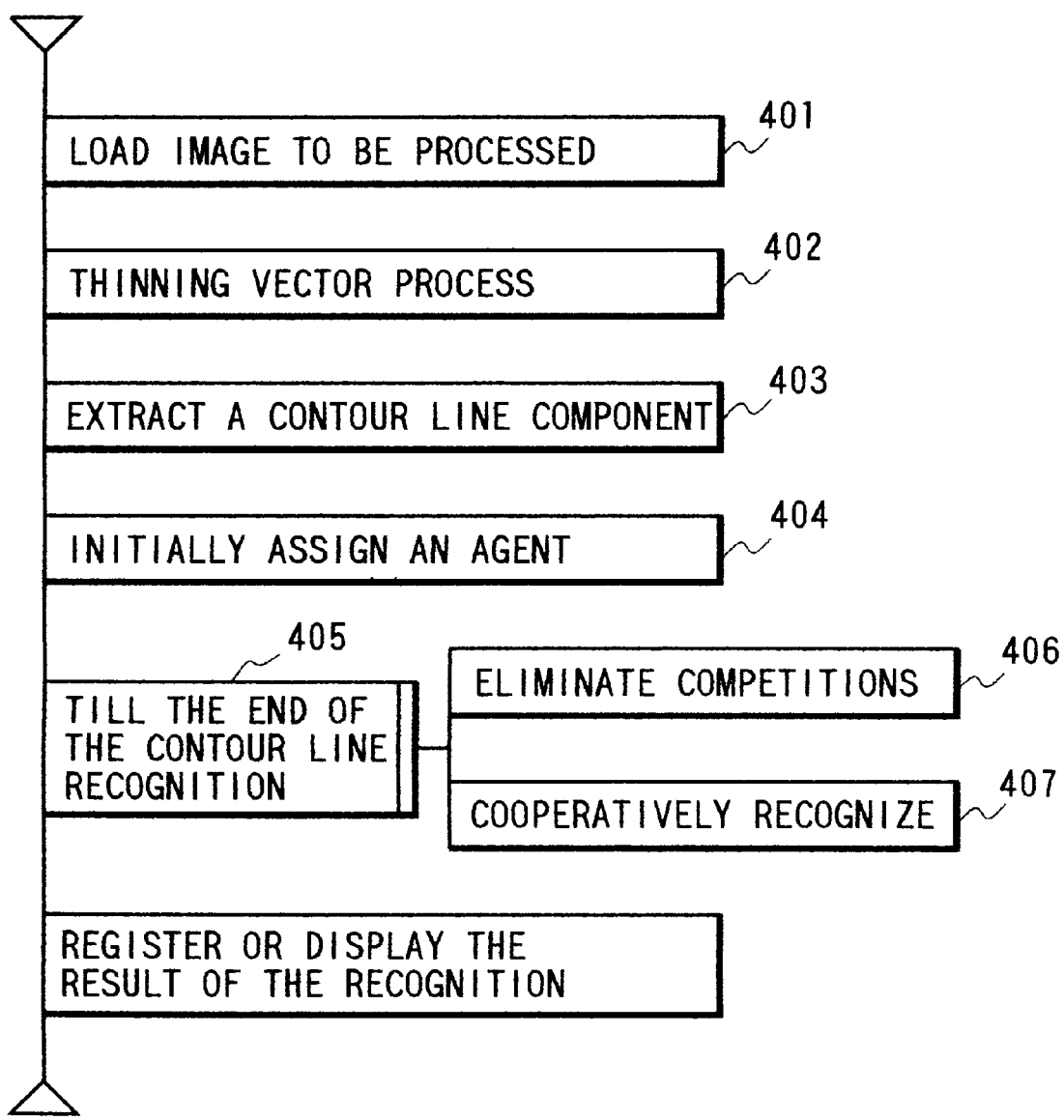
FIG. 2 is a PAD diagram showing the flow of the entire process of the present invention.

The outline of the processing operation of the entire system shown in FIG. 1 will be explained by referring to FIG. 2. FIG. 2 is a PAD diagram showing the processing outline of the entire system.

A PAD (Problem Analysis Diagram) is known as a kind of a flow chart in which boxes each indicating a process are connected in the form of tree structure charts. A control structure is identified by a special mark indicated in the corresponding box. A repetition structure is indicated by a double solid line in a box, and when the double solid line is on the right side of a box as shown as 405 in FIG. 2, the box indicates that the repetition is followed by a judgment. A selection structure is indicated by a triangularly concave cut right side of a box as shown as 420 in FIG. 4. Processes included in the structure are connected such that the processes of lower hierarchy layer are extended to the right side of an upper layer box with horizontally connected lines. Processes in the same hierarchy layer proceed from up to down in the structure.

Firstly, a contour map to be processed is read by the scanner 2 and stored in the file (1) 3 as binary image data (Step 401).

The vectorization process (preprocess program: Step 402) is performed for the original image data of the contour map stored in the file (1) 3 as a preprocess first and vectorized data of the inputted contour map itself including a recognition object is obtained. In this embodiment, vectorized data of contour lines is obtained. One recognition agent (equivalent to a tracing agent) is assigned to the obtained one continuous contour line (initial assignment program: Step 404) and the contour line is recognized. Until all the processes of assigned recognition agents end, the competition elimination process and cooperative recognition process between the recognition agents are repeated (recognition program: Steps 405 to 407). When the contour line recognition process ends, the result is stored in the storage device such as the file (2) 4 as a final result (registered program). If necessary, it is displayed on the display device. Next, each process will be explained.

(2) Vectorization process (Preprocess program: Step 402)

Figure 3:
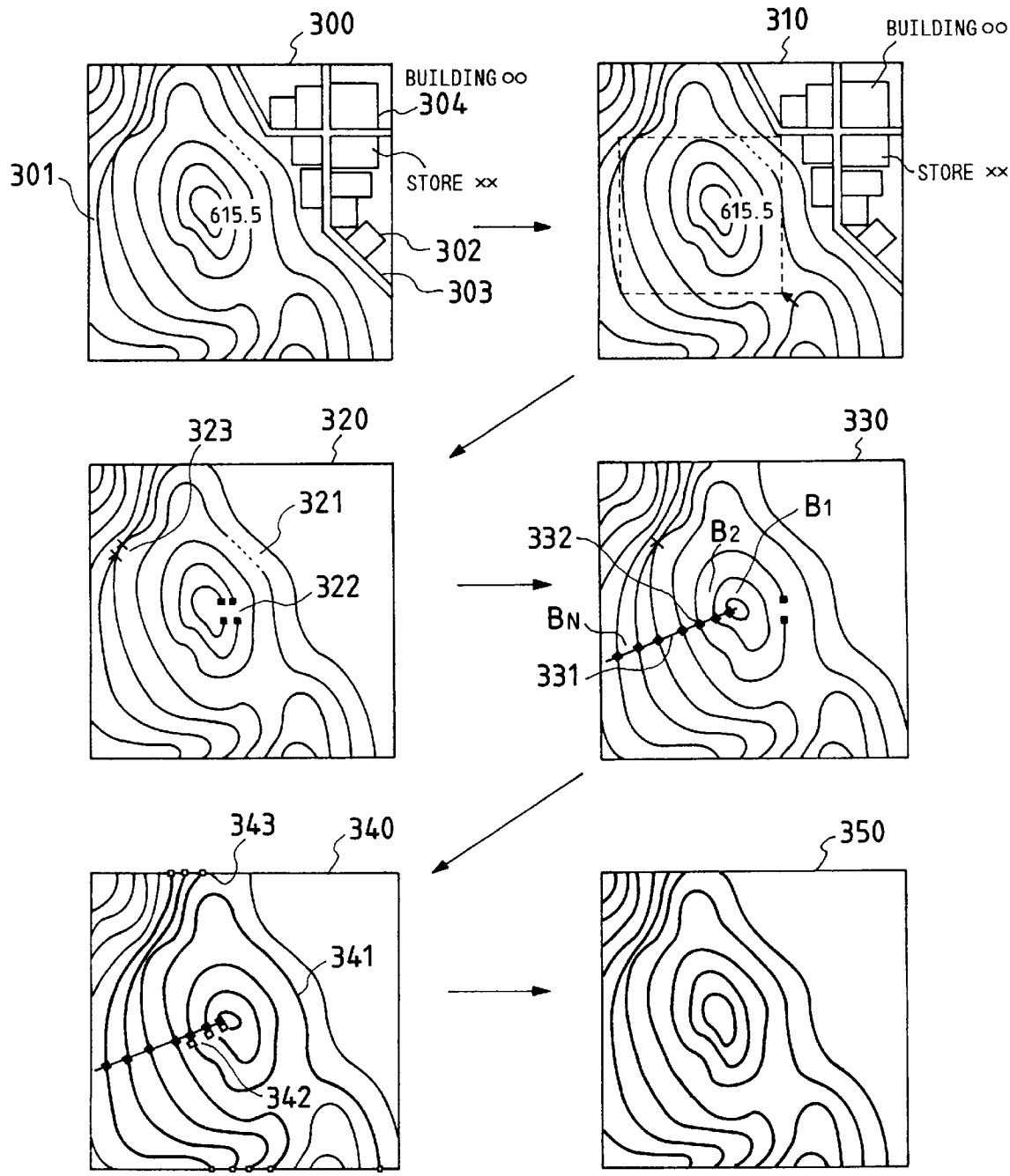
FIG. 3 is a drawing showing display drawings of the process of the present invention.

FIG. 3 shows drawing display examples for explaining the process of the present invention. The drawing display 300 is a drawing showing vector data after the vectorization process is performed for the original image data of the contour map read from the file (1) 3.

According to the present invention, the drawing process such as point reduction or (whisker) noise reduction by polygonal approximation is executed after a series of processes.

When the thinning process is executed at the same time with the vectorization process, to avoid deformation of a drawing caused by the thinning process, the image process such as noise elimination and separation of characters and symbols may be executed before the thinning process.

(3) Assignment of an agent to a drawing to be recognized (Initial assignment program: Steps 403, 404)

(3-1) Extraction of an area to be recognized (contour component line)

The drawing display 300 is a display of binary image data in which a general contour map is read. Such a contour map includes not only contour lines 301 but also various components such as a house frame 302, a road 303, and numeric characters indicating elevation and characters 304. To extract a figure which is a drawing to be processed from the drawing display 300, the area to be processed is designated directly by the input device 6 (310). An area surrounded by a square dotted line in the drawing display 310 indicates such an area designated by a user using a mouse. It is possible to designate and delete components other than the figure such as the house frame 302, the road 303, and the numeric characters indicating elevation and characters 304 by the input device 6 and designate the remaining display as an area to be recognized (320).

Needless to say, when a read image comprises only drawings to be recognized or the image process of separating characters and symbols explained in Item (2) is already executed, it is desirable to just designate an area to be processed.

A user may designate an object to be recognized from the outside as described in the aforementioned method. However, as shown below, a method of automatically extracting a drawing to be recognized may be used. The method will be explained by referring to FIGS. 4 to 9.

Figure 4:
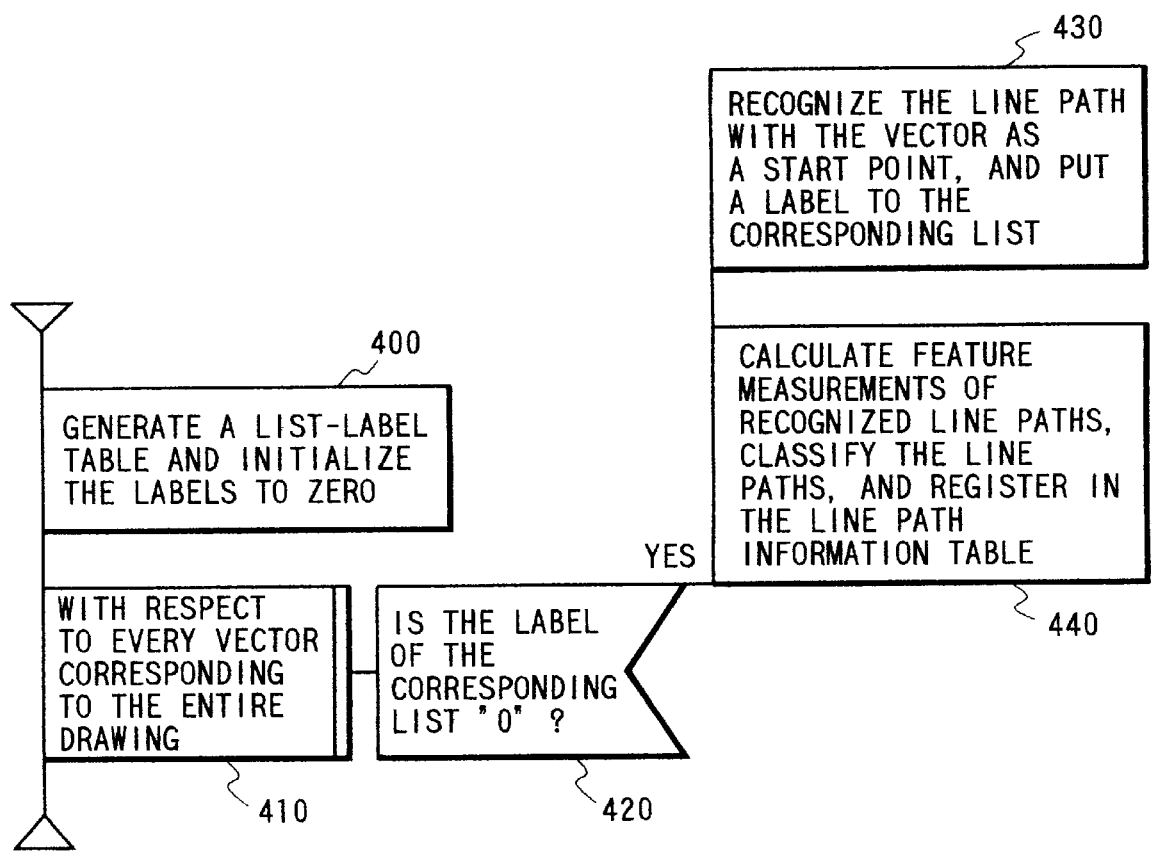
FIG. 4 is a PAD drawing showing the automatic extraction process of contour component lines.
Figure 5:
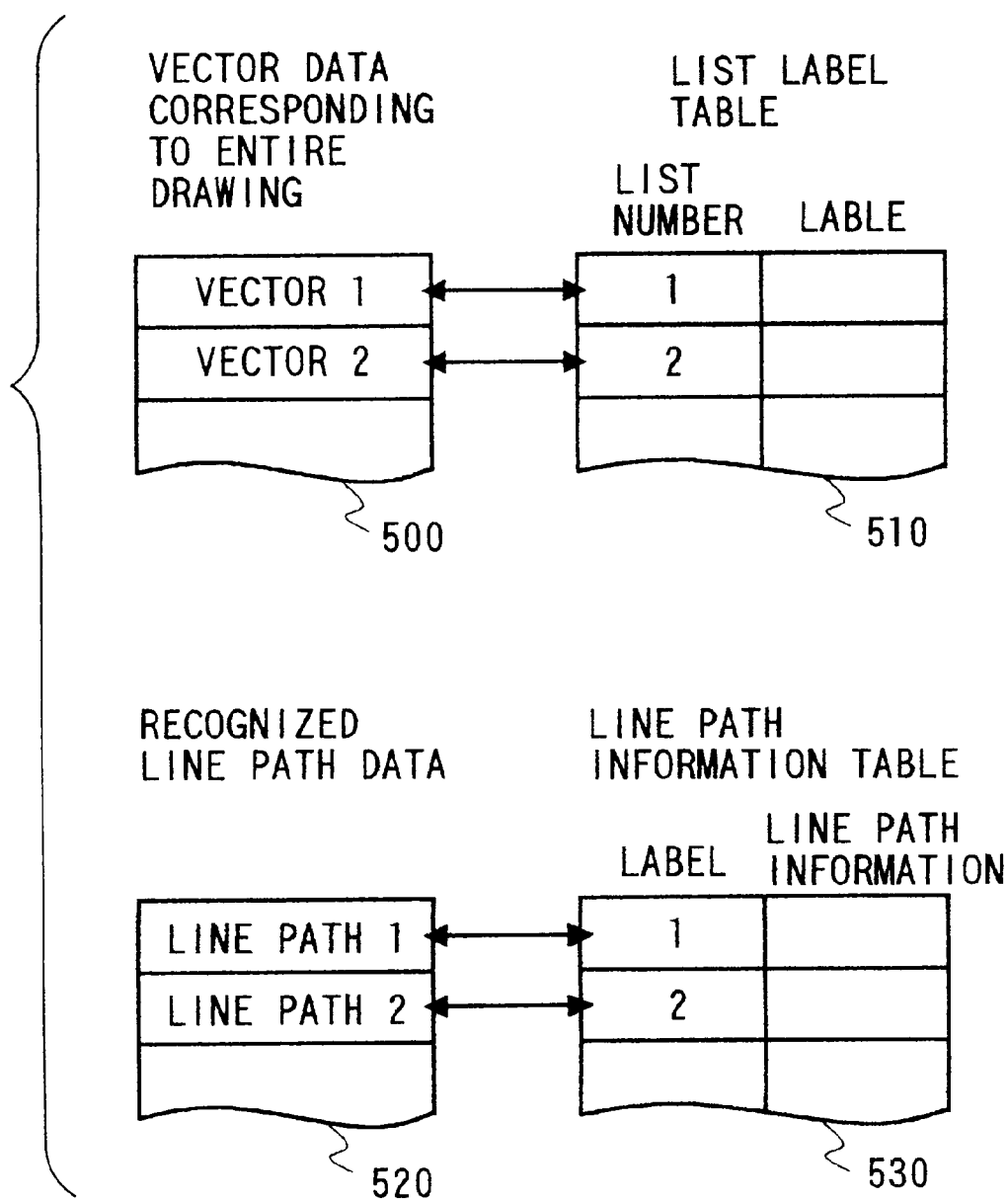
FIG. 5 is a drawing showing the structure of a table used in the automatic extraction process of contour component lines.

FIG. 4 is a PAD drawing showing the automatic extraction process of contour component lines and FIG. 5 is a drawing showing the table structure used in this method. Numeral 500 indicates a vector data table corresponding to the entire drawing and the table stores information on the coordinates of the start point and terminal point of a vector obtained by the thinning vectorization process (Step 402). Firstly, the program generates a list label table corresponding to 500 and initializes the labels to zero (Step 400). Numeral 510 indicates a list label table, and each list number indicates the number of the corresponding vector stored in 500, and each label indicates flag information on whether the recognition of the corresponding vector ends or not. With respect to every vector corresponding to the drawing (Step 410), the program decides whether the label of the corresponding list is zero or not (Step 420). When the label is zero, the program recognizes the line path with the vector as a start point and puts a label to the corresponding list (Step 430). For example, the program puts the number of the recognized line path as a label. Numeral 520 indicates a table of recognized line path data and the table stores information on the number and coordinates of constituent points of a line path. The program calculates feature measurements of recognized line paths from the information, classifies the line paths by clustering in the characteristic space, and stores them in the line path information table (Step 440). Numeral 530 indicates a line path information table, and each label indicates the number of the corresponding line path stored in 520, and the line path information indicates classification in the feature measurement space. For example, when the line path does not correspond to an object to be recognized, 0 is assigned and when it does, 1 is assigned.

Figure 6:
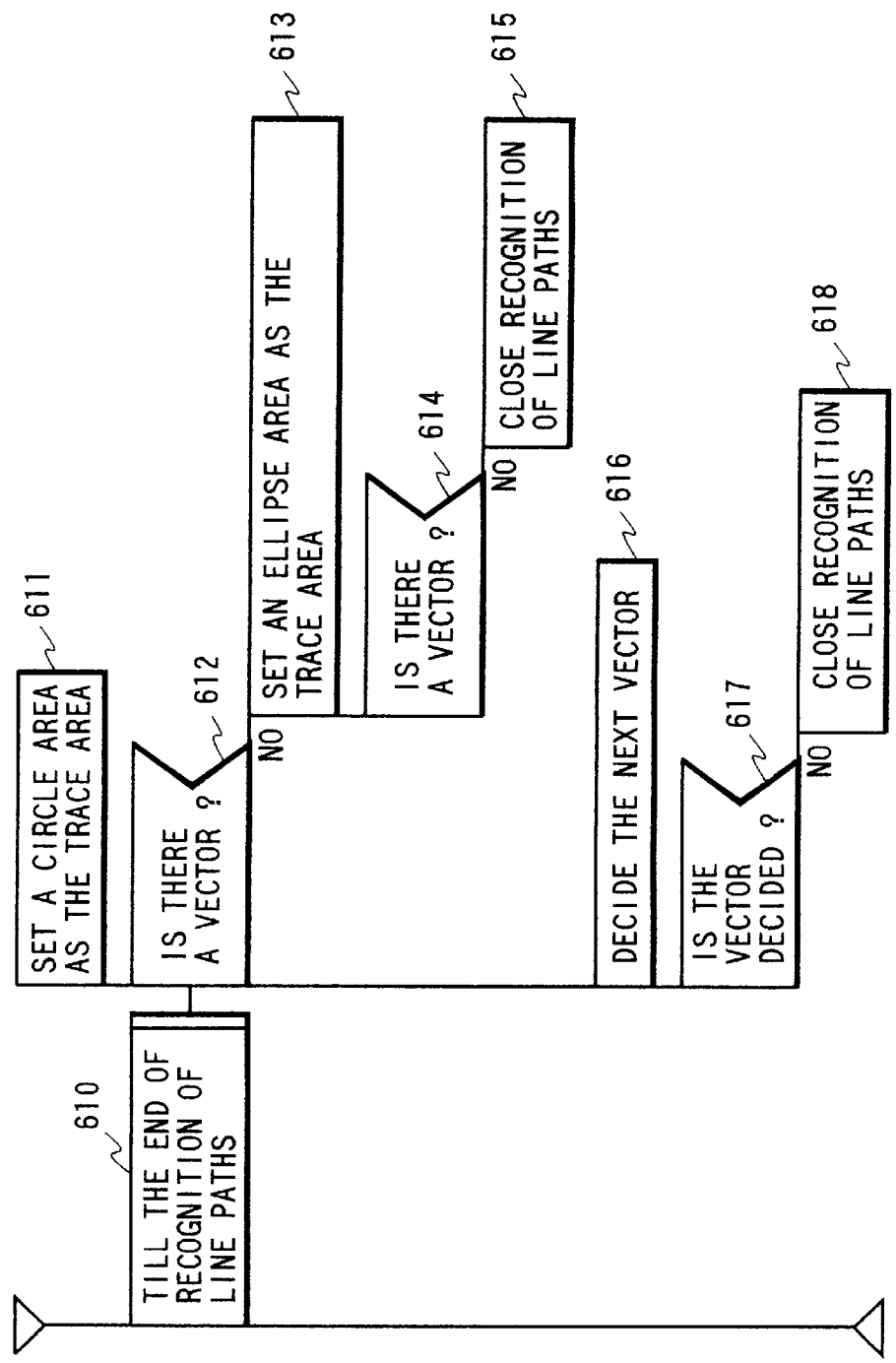
FIG. 6 is a PAD drawing showing the recognition process of line paths.
Figure 7A:
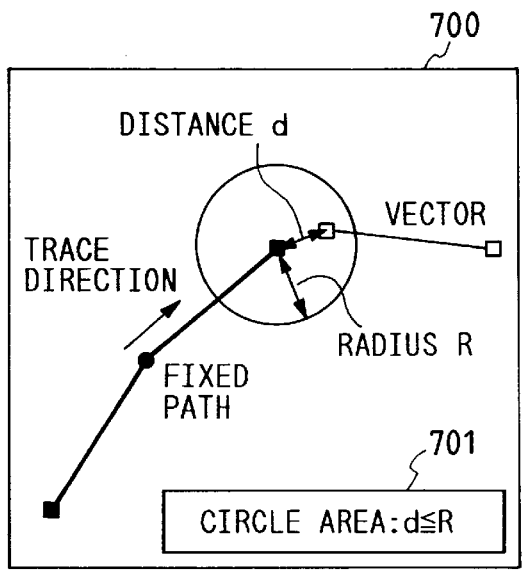
FIG. 7 (a)–FIG. 7 (c) are illustrations for the setting method of a trace area and the decision method of a vector.
Figure 7B:
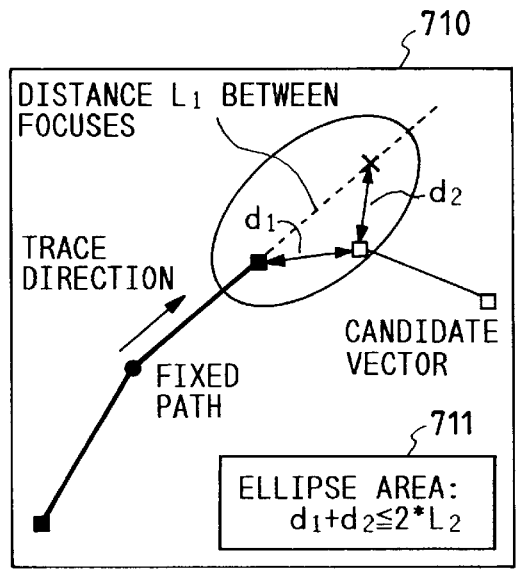
Figure 7C:
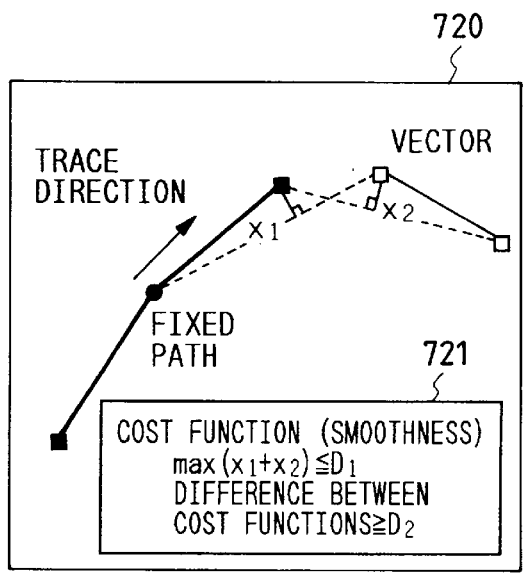

Next, the line path recognition method in the contour component line extraction method will be explained with reference to FIGS. 6 and 7. FIG. 6 is a PAD drawing showing the flow of line path recognition process and FIGS. 7(a)–7(c) are illustrations for the setting method of a trace area and the decision method of a vector in this method. Firstly, the program sets a circle area as a trace area (Step 611) and traces the neighboring area of the trace base point (end point of the fixed path). Numeral 700 indicates an illustration for setting this circle area. In this case, a circle area with the trace base point as the center is set and a vector having a terminal point in this area is traced. However, a vector whose recognition ends already is removed from a tracing object. The radius of the circle is set to a value which is sufficiently small compared with the distance between adjacent contour lines. The condition for whether a vector has a terminal point thereof in this circle area or not is expressed by the conditional equation shown in 701. When there is no vector in the circle area (Step 612), the program sets an ellipse area as a trace area (Step 613) and enlarges and traces the trace area again. Numeral 710 indicates an illustration for the setting method of this ellipse area. In this case, the program sets an ellipse area with the trace base point (end point of the fixed path) and a point on the extension line of the fixed path as two focuses and traces a vector having a terminal point in this area. The condition for whether a vector has a terminal point thereof in this area or not is expressed by 711. When there is no vector in the ellipse area (Step 614), the program ends the recognition of line paths (Step 615). When there is a vector in the ellipse area, the program decides the vector with the smoothness of the line when the vector is connected as a cost function (Step 616). Numeral 720 indicates an illustration for the vector decision method on the basis of the line smoothness. Numeral 721 indicates a definition of the cost function and a vector decision condition. When there are at least two vectors as a candidate, if any of the vectors is connected smoothly, the next vector cannot be decided. When the cost function is below the designated range and the difference between the cost functions is beyond the designated range, the vector is decided as a next vector. When no vector is decided (Step 617), the program ends the recognition of line paths (Step 618). The process from setting of a trace area to setting of a vector is repeated until the recognition of line paths ends (Step 610). Numeral 730 indicates a list of parameters used for recognition of line paths.

Next, the classification method of line paths in the contour component line extraction method will be explained with reference to FIG. 8. Numeral 800 indicates a drawing showing an example of recognized line paths. The recognized line paths comprise vector parts where vector data exists and gap parts where no vector data exists. A contour line drawing is characterized in that 1) it is meandered, and 2) it is indicated by a solid line, and 3) it has a length over an extent. Therefore, by using the clustering process in the characteristic space, a line path corresponding to a contour line drawing can be extracted. Numeral 810 indicates the feature measurement corresponding to the basic property that the lines are meandered and the condition of feature measurement for satisfying this basic property. This feature measurement of the basic property is expressed by "distance/path length between start and terminal points" and when the feature measurement is below the designated range, the lines are judged to be meandered. Numeral 820 indicates the feature measurement corresponding to the basic property that the lines are displayed by a solid line and the condition of feature measurement for satisfying this basic property. This feature measurement of the basic property is expressed by "total sum of vector lengths/path length" and when the feature measurement is beyond the designated range, the lines are judged to be displayed by a solid line. Numeral 830 indicates the feature measurement corresponding to the basic property that the lines have a length over an extent and the condition of feature measurement for satisfying this basic property. This feature measurement of the basic property is expressed by "path length".

Next, the parameter setting method in extraction of contour component lines will be explained with reference to FIG. 9. When the line path classification method on the basis of the feature measurements is used as a contour component line extraction method, it is necessary to set the range of feature measurements as a parameter. FIG. 9 is a drawing showing an interface for setting such a parameter. Numeral 900 indicates a parameter setting screen, 910 a window for coloring and displaying the line paths corresponding to the feature measurement range designated by an operator, and 920 a window for setting the feature measurement range of line paths by an operator. The parameter setting in 920 is executed by expanding and contracting the bar indicating the feature measurement range by operating the mouse or inputting the feature measurement range from the keyboard. When a parameter is set like this, the line paths corresponding to the feature measurement range are displayed on the window in 910. When the parameter is updated, the corresponding line paths are displayed again.

(3-2) Assignment of an agent to a drawing to be recognized (Step 404)

Next, an agent is assigned to a drawing to be recognized by setting an area or a parameter.

Numeral 330 shown in FIG. 3 indicates how the initial value of parallel trace is set. The initial value is designated as shown below. An operator draws a trace tag line 331 so that it goes across a plurality of adjacent contour lines using the input device 6. The intersecting points of the trace tag line 331 with the plurality of adjacent contour lines to be recognized are taken as trace base points 352. A plurality of designated trace base points 352 are taken as B1, B2, - - -, and BN. The order of the trace base points 332 on the trace tag line 331 indicates the adjacent relation of the corresponding contour lines. Then, tracing of the line paths of the contour lines is started in parallel with each trace base point 332 as an initial characteristic point.

A method of assigning an agent to each of contour lines suitably and automatically grasping the adjacent relation between the agents will be explained hereunder.

Figure 10:
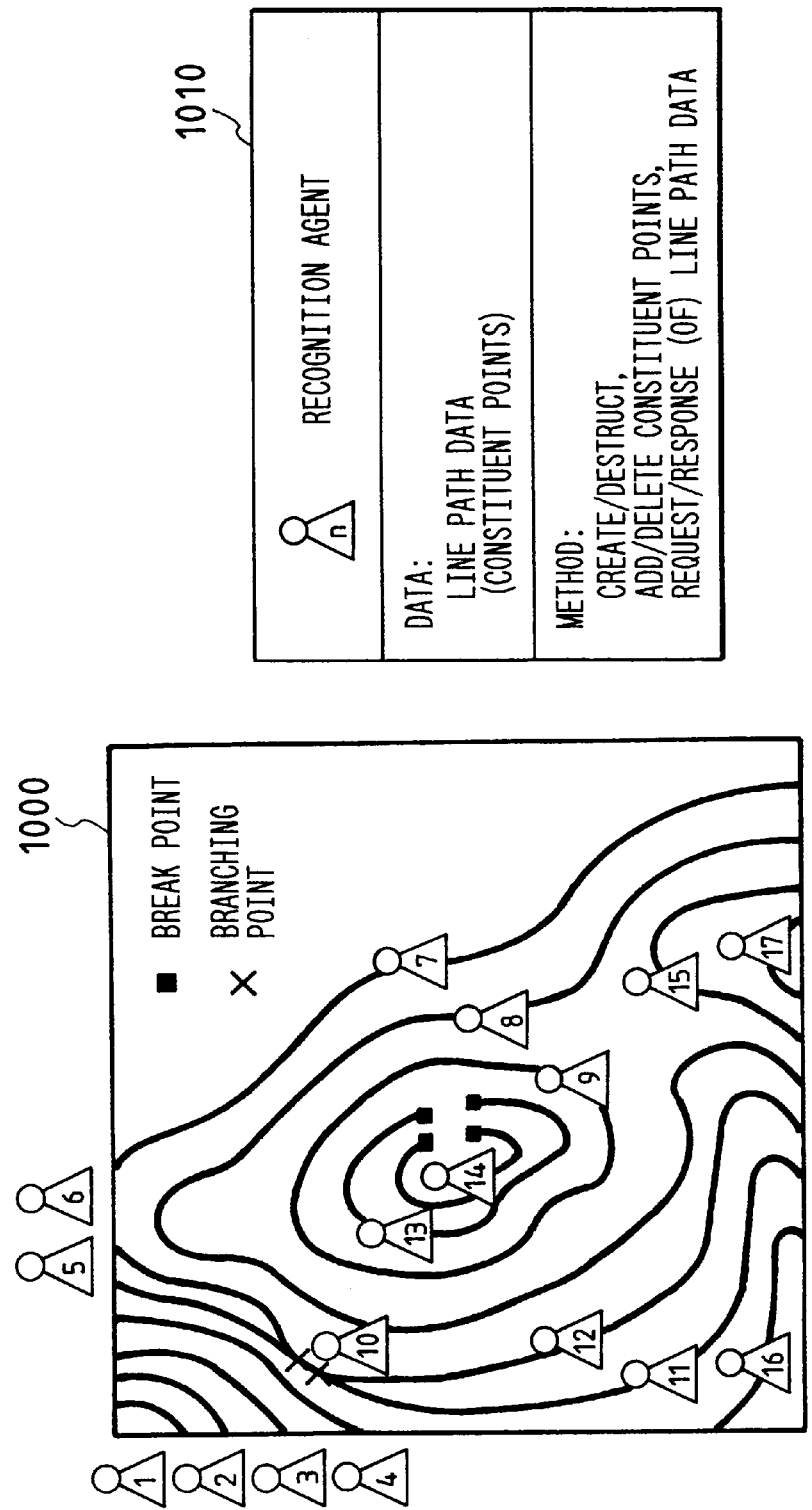
FIG. 10 is a drawing showing the initial assignment method of recognition agents.

Next, the initial assignment method of recognition agents in the drawing recognition method of the present invention will be explained with reference to FIG. 10. It is assumed that the extraction of contour component lines ends already and the contour component lines are recognized and registered as line paths according to the local criteria. FIG. 10 is a drawing showing initial assignment of recognition agents. Numeral 1000 indicates a drawing showing the correspondence between the line paths recognized according to the local criteria and the recognition agents. The line paths are interrupted by break points and branching points. One recognition agent is assigned in correspondence to each of such line paths. Numeral 1010 indicates data and a method of a recognition agent. This recognition agent has line path data (the number and coordinates of constituent points) as data and has an operation of creating or destructing a recognition agent, an operation of adding constituent points to the line path data or deleting constituent points from the line path data, and an operation of requesting line path data to another recognition agent or responding line path data to this request as a method.

Figure 11:
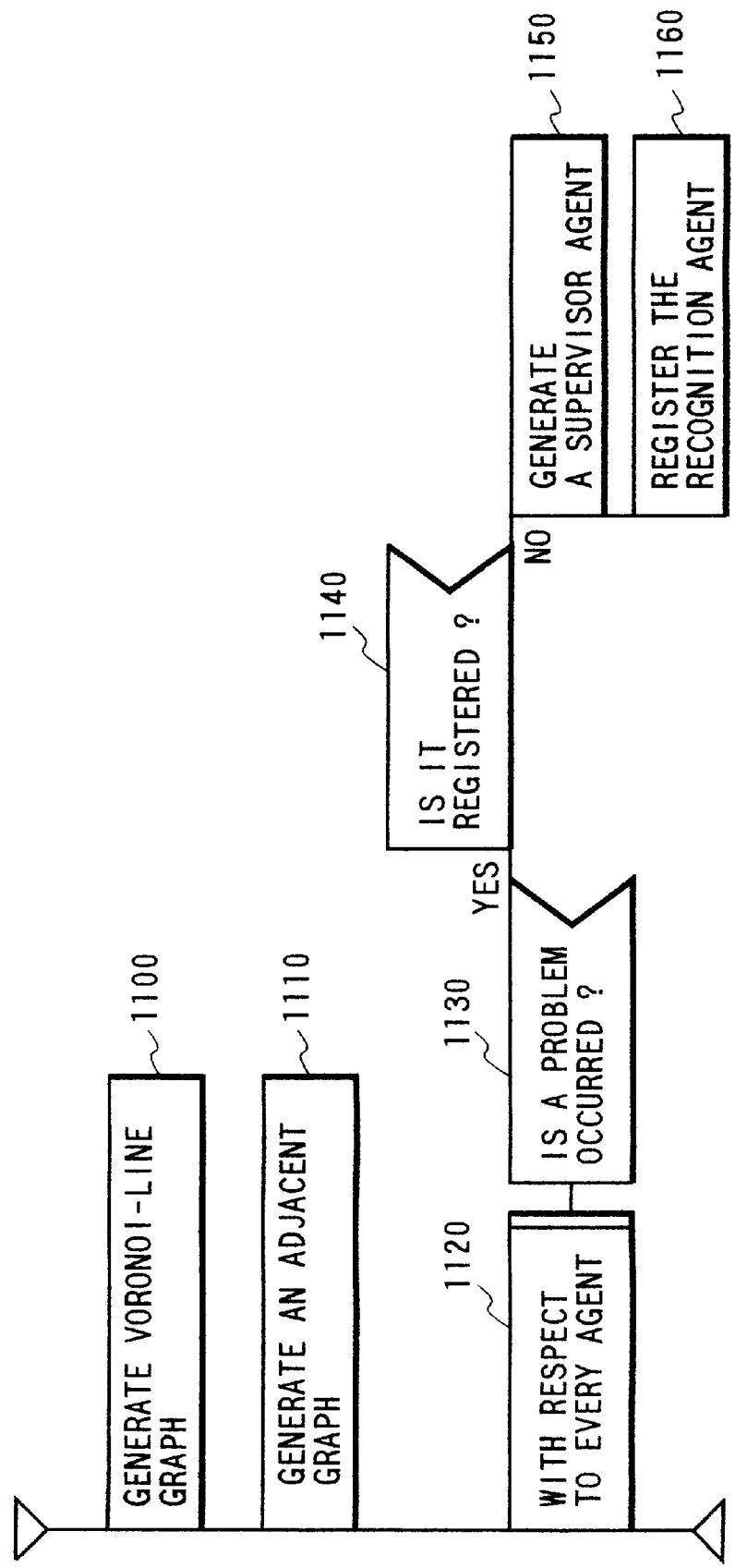
FIG. 11 is a PAD diagram of the process of recognizing the adjacent relation of recognition agents.
Figure 12:
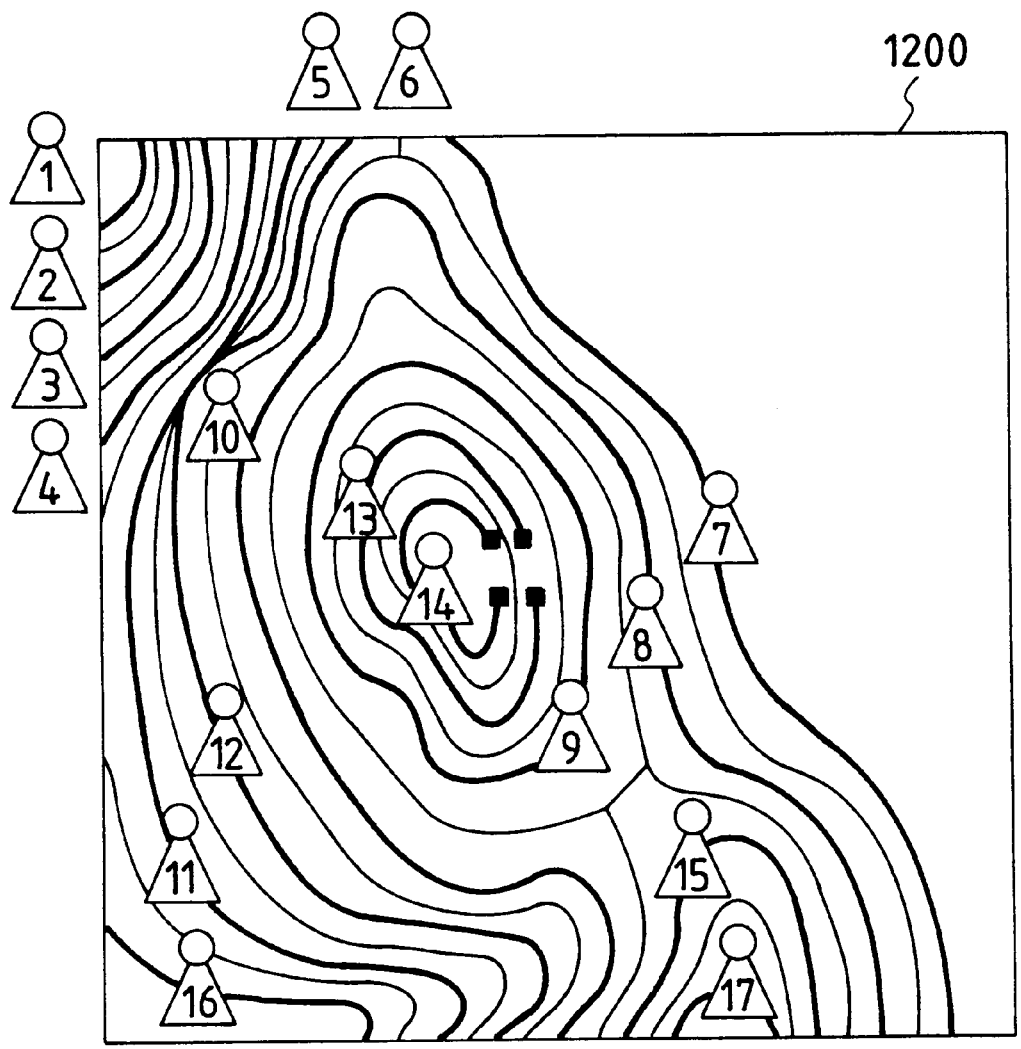
FIG. 12 is a Voronoi-line graph used to grasp the adjacent relation.
Figure 13A:
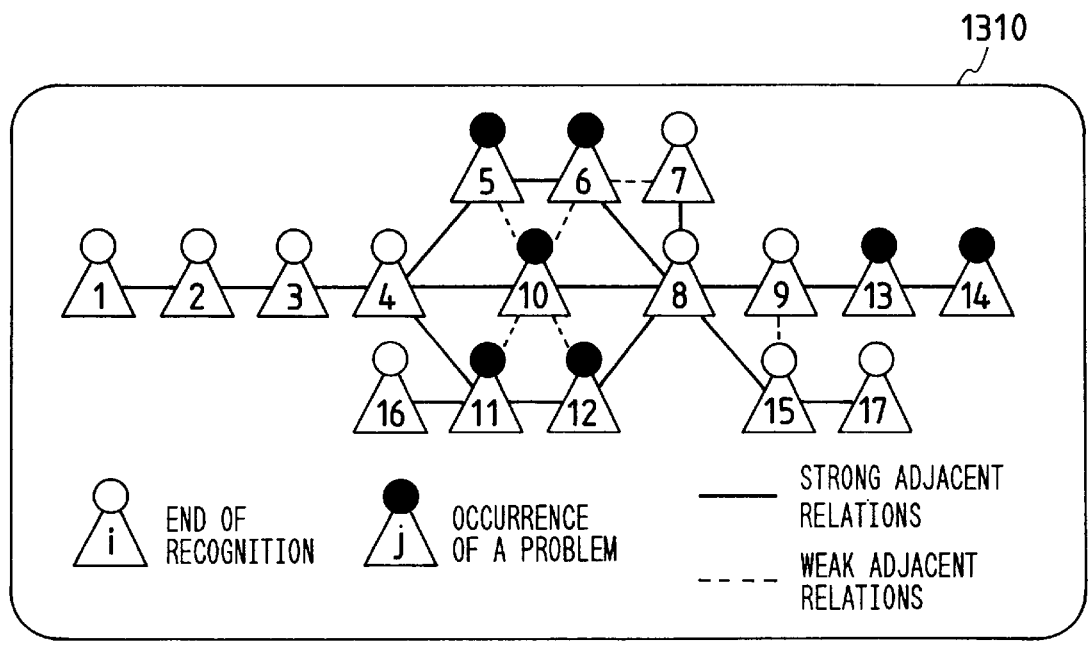
FIG. 13 (a)–FIG. 13 (b) are illustrations for the setting method of supervisor agents.
Figure 13B:
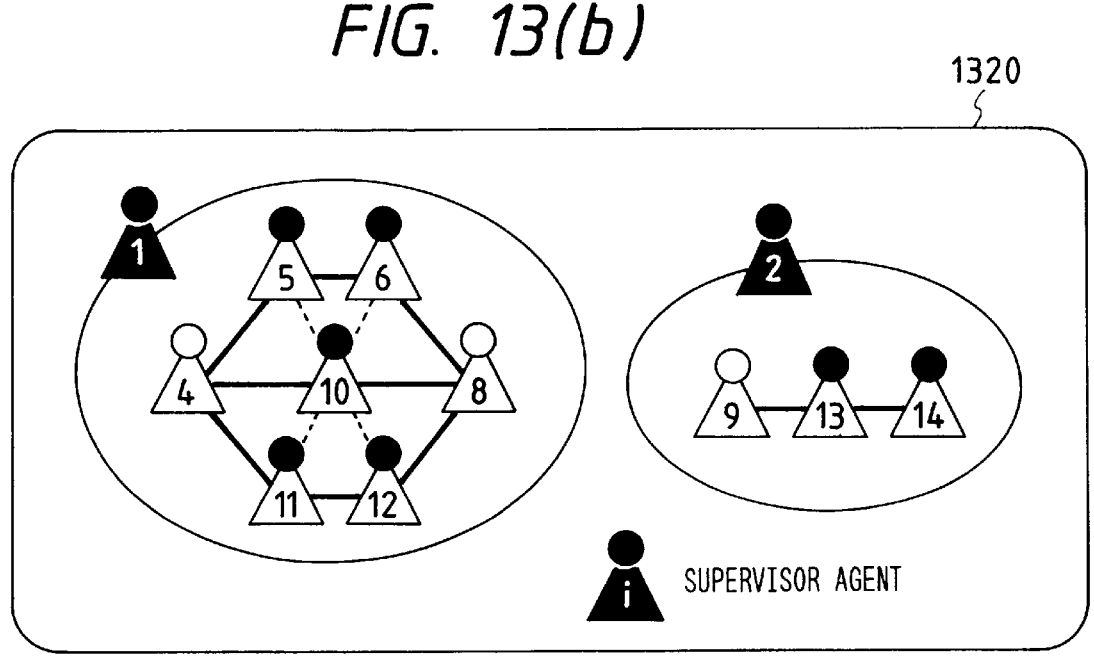

Next, a method of recognizing the environment by a recognition agent when a problem occurs in the drawing recognition method of the present invention will be explained with reference to FIGS. 11, 12, and 13. To solve a problem of obtaining the linkage relation between line paths in an interruption part or a junction part by cooperation of a plurality of recognition agents, it is necessary to grasp the adjacent relation between the recognition agents as an environment where the recognition agents are installed. FIG. 11 is a PAD diagram showing the process flow in the adjacent relation recognition method, and FIG. 12 is a drawing showing a Voronoi-line graph used to grasp the adjacent relation, and FIG. 13 is a drawing showing the setting method of supervisor agents for controlling recognition agents. For example, the adjacent relation between recognition agents is obtained by using a Voronoi-line graph in a method the same as that of Reference 2. Firstly, the program generates a Voronoi-line graph comprising bisectors between line paths (Step 1100) and then generates an adjacent graph indicating a network of the adjacent relation by using it (Step 1110). Numeral 1200 indicates a Voronoi-line graph and 1310 indicates a corresponding adjacent graph. Each solid line indicates a case that the length of the boundary line (Voronoi-line graph) between adjacent line paths is longer than the length of the corresponding line path and each dashed line indicates a case that it is shorter. It is highly probable that each solid line indicates the adjacent relation between contour lines themselves, so that it is called strong adjacent relations hereinafter and each dashed line has a low possibility for it, so that it is called weak adjacent relations hereinafter. On the basis of the basic property of a contour line drawing that the drawing itself is a closed loop or the terminal point thereof exists on the page boundary line, when this property is satisfied, the recognition ends and when the property is not satisfied, the recognition agent is distinguished and displayed because a problem occurs. The page indicates an area as a processing unit. With respect to every recognition agent (Step 1120), when a problem occurs in the recognition agent (Step 1130) and the recognition agent is not registered in any supervisor agent (Step 1140), the program generates a supervisor agent (Step 1150) and registers the recognition agents belonging to it and the adjacent relation thereof (Step 1160). Numeral 1320 indicates a drawing showing the relation between the supervisor agent and the recognition agents corresponding to it.

(4) Contour line recognition process (Recognition program: Steps 405 to 407)

When the adjacent relation of the agents assigned to each of the contour lines becomes clear, the recognition process as significant contour lines is executed according to the adjacent relation. Even if a user initializes the adjacent relation of agents using trace tag lines as 330 shown in FIG. 3, a trace tag line may be drawn doubly to one contour line by mistake or a trace tag line may be drawn to a drawing other than an object to be recognized such as a road which cannot be removed by the thinning process. When an agent is set automatically, a plurality of agents may be assigned to one contour line due to breaking, branching, or connection of contour lines or only one agent may be assigned to a plurality of contour lines.

The contour line recognition process comprises a competition elimination process of unifying or separating agents so as to realize a one-to-one correspondence between contour lines of a specific height and agents and a cooperative recognition process of recognizing another contour line already recognized in cooperation with an agent assigned to the contour line.

(4-1) Competition elimination process

The competition elimination process between recognition agents of the present invention will be explained with reference to FIGS. 14, 15, and 16. In this embodiment, competition between recognition agents is eliminated by unifying or separating the recognition agents.

FIG. 14 is a drawing showing the unification method of recognition agents in a problem portion such as an interruption part. Numeral 1400 indicates initial assignment of recognition agents in an interruption part. In this case, two recognition agents (2 and 4) are assigned in correspondence to one contour line. Numeral 1410 indicates a supervisor agent and recognition agents corresponding to the interruption part. In this case, there is a weak adjacent relation between the recognition agents (2 and 4). When there is such an adjacent relation, the supervisor agent unifies these two recognition agents and generates a new recognition agent. Numeral 1420 indicates unification of the recognition agents by the supervisor agent and 1430 indicates the adjacent relation of the new agent.

FIG. 15 is a drawing showing the unification method of recognition agents in a problem portion such as a junction part. Numeral 1500 indicates initial assignment of recognition agents in a junction part. In this case, three recognition agents (2, 5, 6 or 3, 5, 7) are assigned in correspondence to one contour line. Numeral 1510 indicates a supervisor agent and recognition agents corresponding to the junction part. In this case, there is a weak adjacent relation between the recognition agents (2 and 5, 3 and 5, 5 and 6, 5 and 7). When there is such an adjacent relation, the supervisor agent unifies these two recognition agents respectively and generates new recognition agents. Numeral 1520 indicates unification of the recognition agents by the supervisor agent and 1530 indicates the adjacent relations of the new agents.

FIG. 16 is a drawing showing the separation method of recognition agents in a problem portion such as a junction part. Numeral 1600 indicates initial assignment of recognition agents in a junction part. In this case, one recognition agent (3) is assigned to three contour lines. Numeral 1610 indicates a supervisor agent and recognition agents corresponding to the junction part. In this case, a contradiction (neighbor of the neighbor=neighbor) is caused between 1, 2, and 3 or 3, 4, and 5. When there is such a cooperative network, there is a high possibility that the three recognition agents common to the two are incorrect. Therefore, as shown in 1620, the supervisor agent separates this recognition agent into three parts and generates three recognition agents newly. Numeral 1630 indicates assignment of the newly generated recognition agents and 1640 indicates the adjacent relation between the new agents.

Figure 17:
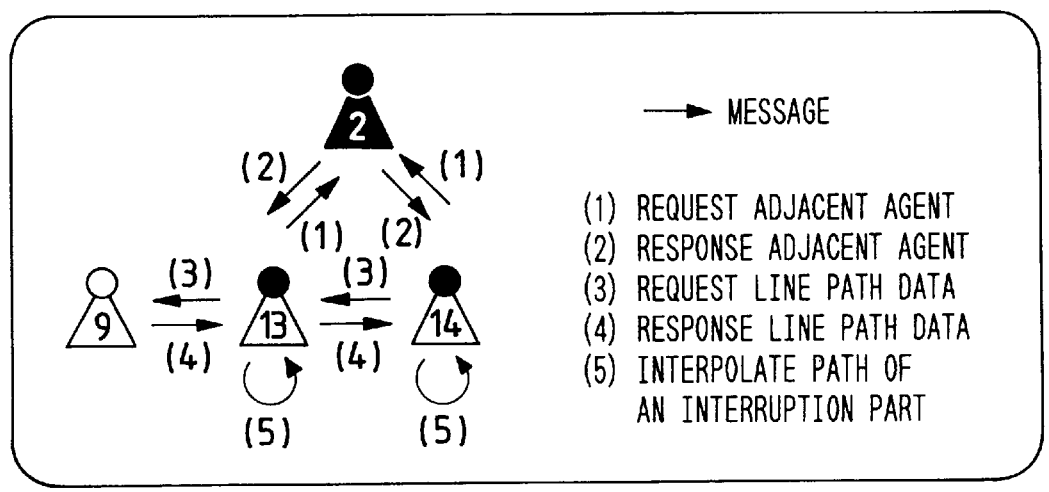
FIG. 17 is an illustration for the transfer relation of messages between recognition agents in cooperative recognition.
Figure 18:
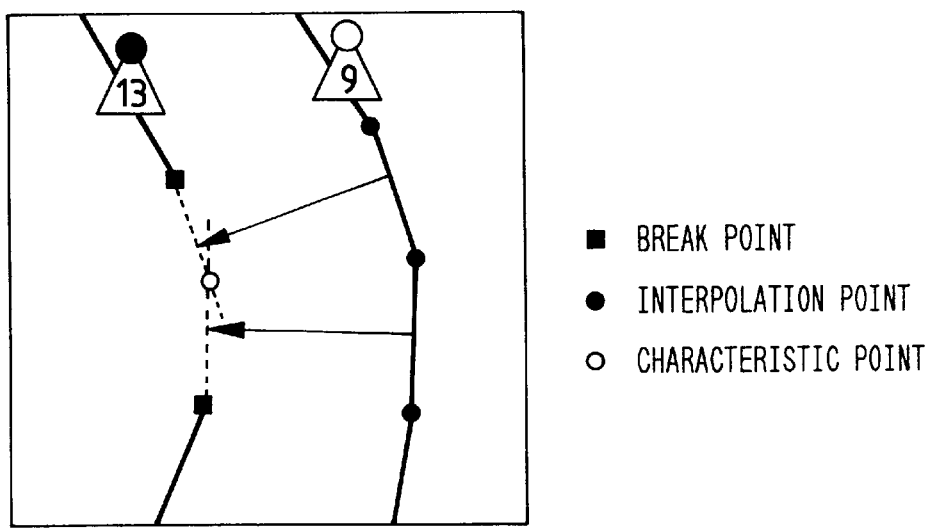
FIG. 18 is an illustration for the path interpolation process in an interruption part in cooperative recognition.

(4-2) Cooperative recognition process for path interpolation FIG. 17 is a drawing showing the message flow between recognition agents by this method and FIG. 18 is a drawing showing the path interpolation process on the basis of this method.

FIG. 17 shows the message flow between the supervisor agent and the recognition agents corresponding to the interruption part shown in FIG. 12. FIG. 18 shows a schematic diagram of the path interpolation method in such an interruption part. The adjacent relation between the recognition agents are already known. A path to be recognized is interpolated by using this adjacent relation.

According to the present invention, when a problem portion such as a junction part 323 or an interruption part 322 appears during path interpolation, the apparatus decides the trace direction with the adjacent contour lines already recognized as a standard.

The cooperative process will be explained hereunder on the assumption that agents are assigned to contour lines by setting the tag line 331 as shown in 330 in FIG. 3. In the case of 330 shown in FIG. 3, the agent trace base point is set by the position where the tag line is inputted. On the other hand, when agents are automatically assigned to contour component lines as shown in FIG. 10, it is desirable that each agent sets an optional position as a trace base point.

Numeral 340 indicates a drawing showing vectorized data after the path tracing with 330 as an initial value ends. Numeral 341 indicates a contour line recognized by path tracing, 342 a loop point, and 343 a boundary point. The loop point indicates a trace base point to which the agent returns when the contour line itself is a closed loop and it is an end point of tracing. On the other hand, the boundary point is positioned on the page boundary and when the tracing reaches this point, the apparatus returns to the trace base point and traces in the reverse direction. When the tracing in the reverse direction reaches the boundary point again, the apparatus sets this point as an end point of tracing. The apparatus performs the aforementioned process from setting of a trace base point to tracing of a characteristic point repeatedly for the entire contour line drawing and obtains recognition results of a wide range of contour lines.

Figure 19:
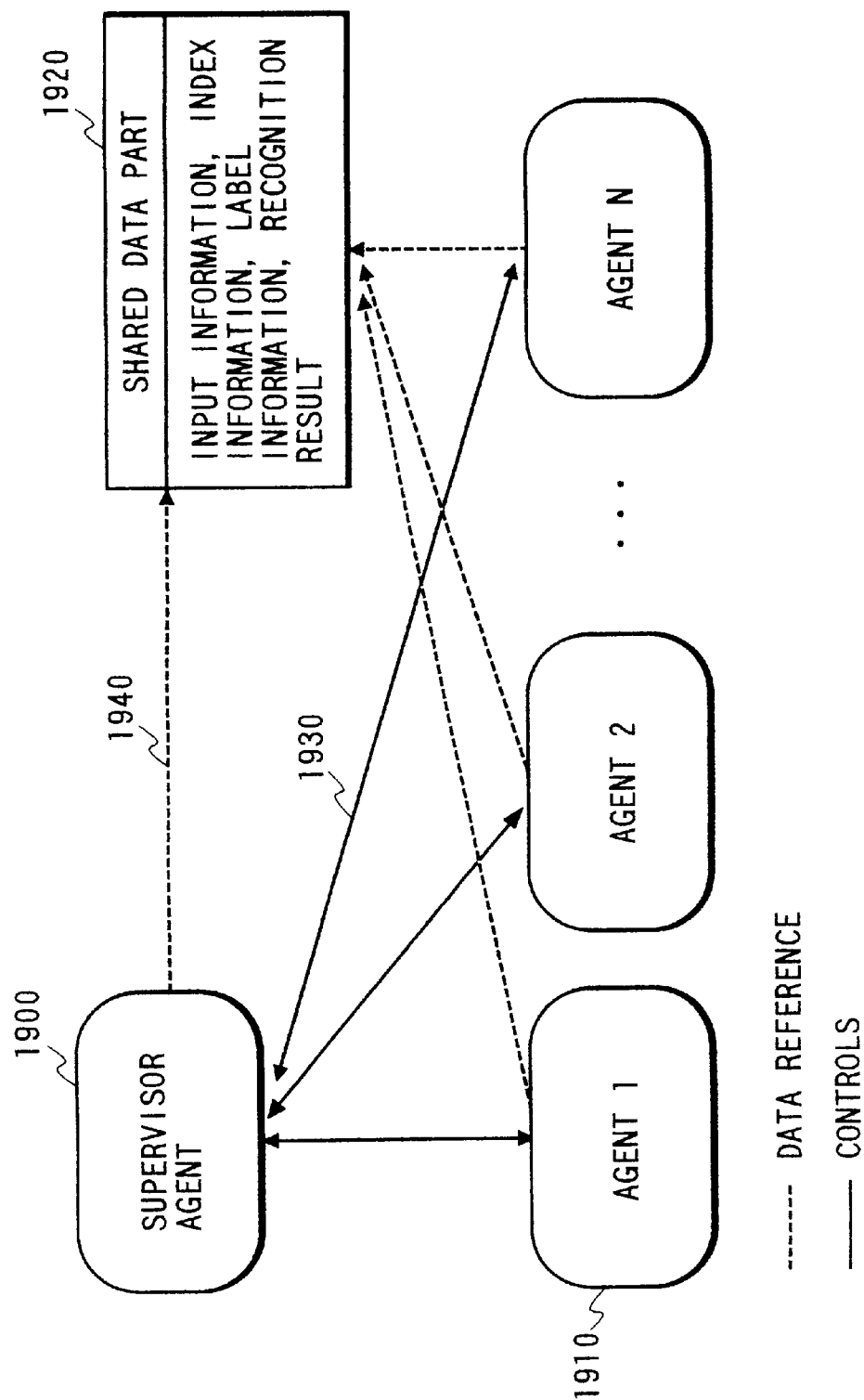
FIG. 19 is a drawing showing the relation among recognition agents, supervisor agents, and data.

Next, the relation between an agent performing the recognition process and data referred to by agents will be explained with reference to FIG. 19. According to the present invention, a system comprises a multi-agent and a process is formulated by describing an autonomous action of each agent and a cooperative action between the agents. The conventional method-oriented approach requires to describe the flow of all processes without omission. However, the approach based on multi-agent theory requires no detailed description of the process flow because a cooperative action between agents is decided dynamically at execution of a program.

Numeral 1900 indicates a supervisor agent for supervising all agents assigned to contour lines, 1910 a vector tracing agent for controlling path trace of each contour line, and 1920 a shared data part. The shared data part stores input information such as contour line image data and vectorized data before recognition processing, index information for performing vector trace at high speed, label information assigned to a vector whose trace ends, and recognition results indicated by position coordinates of characteristic points of contour lines. Numeral 1930 indicates message communication between agents and 1940 indicates data reference. Function definitions of autonomous actions of these agents and preconditions thereof are summarized in FIG. 20 and actual processing contents of a cooperative action between agents are summarized in FIG. 21. Numerals 2001 and 2002 indicate function definitions and preconditions of an agent (recognition agent) tracing a vector respectively and numerals 2003 and 2004 indicate function definitions and preconditions of a supervisor agent respectively. Numerals 2101 and 2102 shown in FIG. 21 indicate a cooperative action between a supervisor agent and vector recognition agents in a junction part and an interruption part respectively.

Figure 22:
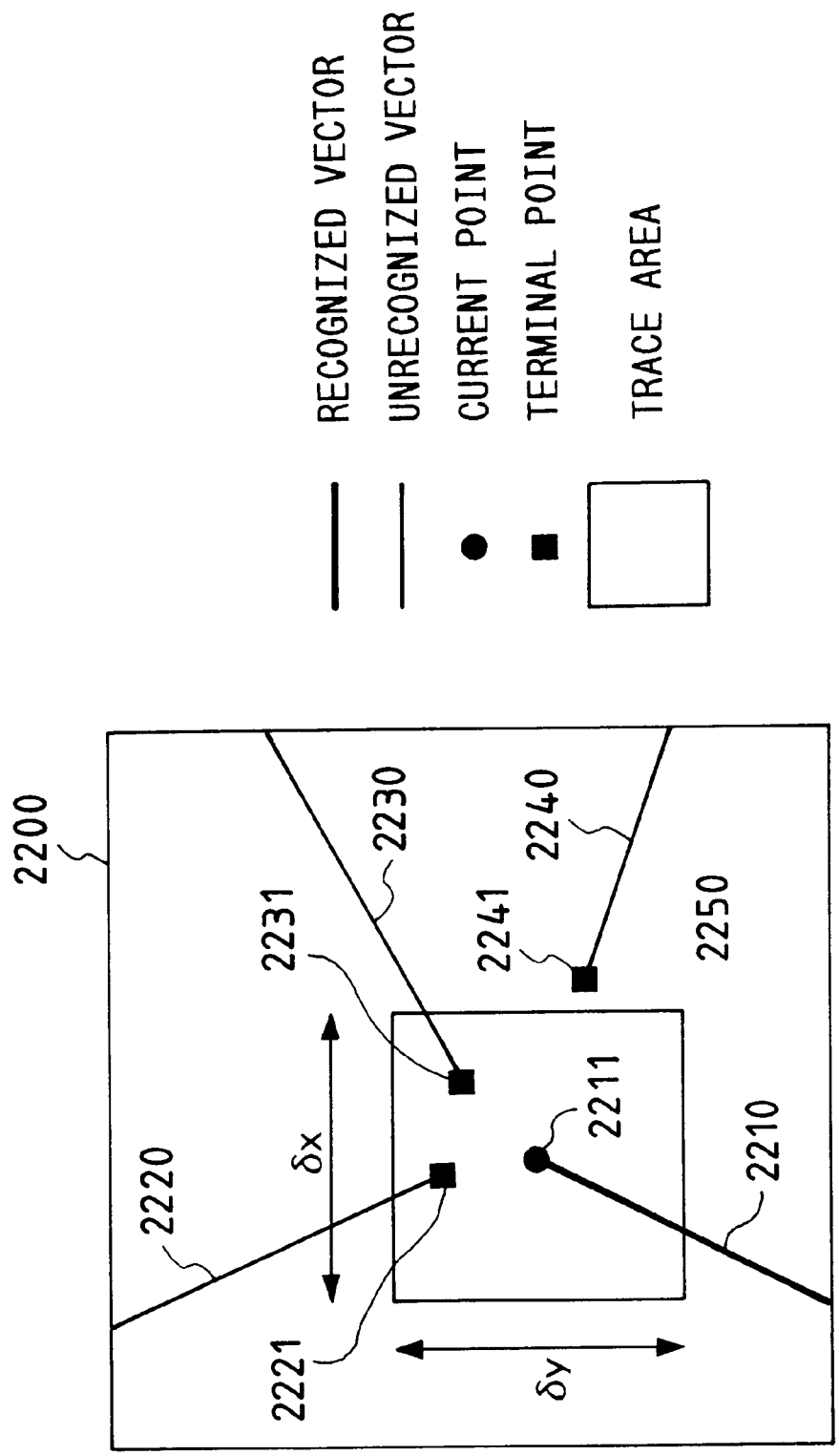
FIG. 22 is an illustration for the path tracing process in an autonomous action of an agent.

Next, a method of path tracing in an autonomous action of a recognition agent will be explained with reference to FIG. 22. It is assumed that the i-th contour line is being traced now. Numeral 2200 indicates vectorized data in the neighborhood of the trace area. Numeral 2210 indicates a recognized vector whose trace ends and numerals 2220, 2230, and 2240 indicate unrecognized vectors whose trace does not end. A terminal point 2211 of the vector 2210 indicates the current point of path tracing and indicates that the tracing ends up to this point. Numerals 2221, 2231, and 2241 indicate terminal points of 2220, 2230, and 2240 respectively. Numeral 2250 indicates a trace area for tracing a next path candidate. In this drawing, 2220 and 2230 are selected as path candidates. When there are recognized vectors of adjacent contour lines in this trace area, a path candidate is selected so that a contradiction such as crossing the adjacent path will not occur.

Figure 23A:
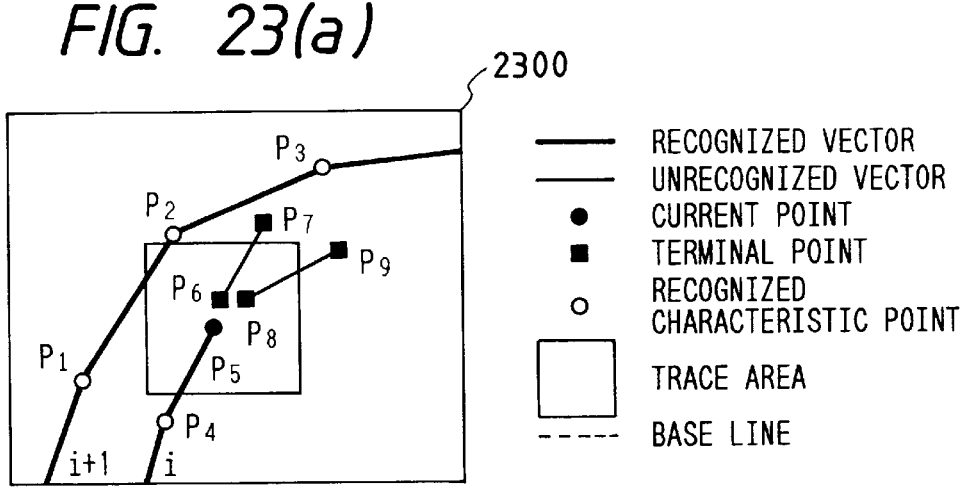
FIG. 23 (a)–FIG. 23 (c) are illustrations for the procedure of constituting a base line for deciding a path candidate on the basis of adjacent information.
Figure 23B:
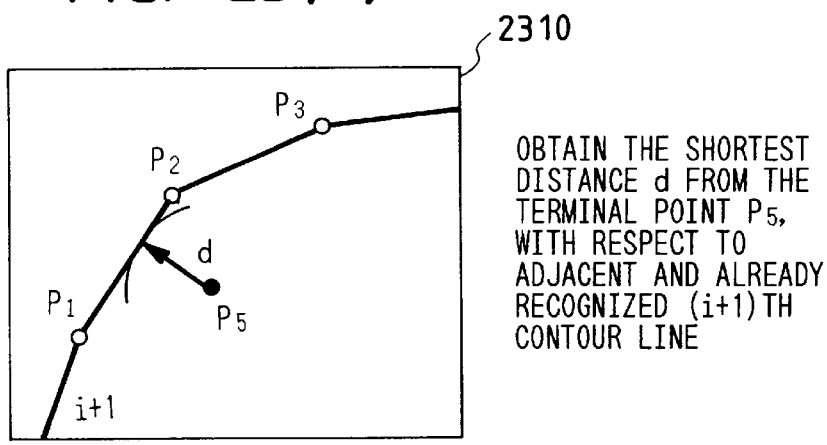
Figure 23C:
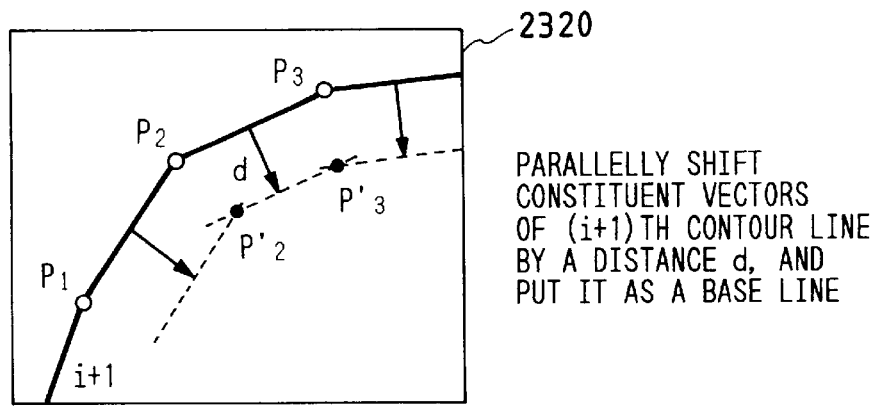

When there are a plurality of path candidates, an optimum path candidate is selected on the basis of the adjacent information as shown in FIGS. 23 and 24. A procedure of constituting a base line for deciding a path candidate on the basis of the adjacent information is shown in FIG. 23. Numeral 2300 indicates that there are a plurality of vectors as a path candidate in the trace area of the i-th contour line. It is assumed that the path tracing of the (i+1)th contour line ends already. As shown in 2310, with respect to the already recognized (i+1)th contour line, the shortest distance d from the current point is obtained. Then, as shown in 2320, the constituent vectors of the (i+1)th contour line are shifted in parallel by a distance of d and it is put as a base line. Next, a method of selecting an optimum path candidate on the basis of this base line is shown in FIG. 24. Numeral 2400 indicates the relation of position of a base line 2410 and a vector 2430. As a path candidate, it is necessary to select a vector closest to this base line in the distance and direction. Therefore, a cost function is defined as shown in 2420 and a vector minimizing this cost function is selected as a next path candidate. In this case, d1 and d2 indicate the shortest distances from both terminal points of the vector 2430 to the base line respectively. Whether or not to recognize the selected path candidate vector as a path is decided by the decision method shown in FIG. 25.

A method of predicting a path on the basis of the path information of adjacent contour lines in a junction part or an interruption part will be explained with reference to FIG. 26. FIG. 26 shows a prediction method in an interruption part. Also in a junction part, a path can be predicted by the same process. Numeral 2600 indicates that there is not a vector as a path candidate in the trace area. It is assumed that the path tracing of the (i+1)th contour line ends already. As shown in 2610, with respect to the already recognized (i+1)th contour line, the shortest distance d from the current point is obtained. Then, as shown in 2620, the constituent vectors of the (i+1)th contour line are shifted in parallel one by one by a distance of d and it is put as a predicted path. When the length of the predicted path is within the designated range, the apparatus continues the prediction until a path candidate vector is found.

(5) Registration in storage device (Registration program)
Data obtained by the aforementioned process is registered in a storage device as continuous vector data showing a drawing inputted by the scanner 2. The storage device may be the file (1) or (2) or the memory 7 shown in the system block diagram in FIG. 1 or another external storage medium not shown in the drawing.

According to the present invention, when inputted drawing data is registered as vector data, by performing a competition or cooperative process between agents using the adjacent relation of agents assigned to a drawing to be recognized, in a problem portion where an originally continuous line is discontinuous or an independent line is connected to another line (the drawing is connected to another drawing), excessive interactive operations reduce and the automatic processing capacity for an uncertain part improves. By doing this, the input cost of a drawing indicated by lines in a data base can be reduced greatly.

Furthermore, even if initial assignment of recognition agents is incorrect, the agent assignment can be changed automatically so as to set recognition agents correctly, and unnecessary interactive operations are suppressed, and a system easy to use for a user can be provided.

The invention has been described with reference to the preferred and alternate embodiments. Obviously, modifications and alternations will occur to those of ordinarily skill in the art upon reading and understanding the present invention. It is intended that the invention be construed as including all such modifications and alternations in so far they come with the scope of the appended claims or the equivalent thereof.

We claim:

1. A drawing registration apparatus comprising:

image data input means for inputting a drawing to be registered as image data;

display means for displaying said image data;

input means for inputting a drawing to be recognized in said image data and the recognition range from the outside, and a storage device for storing at least programs as;

an initial assignment program of assigning recognition agents to said drawing to be recognized existing within said recognition range;

a recognition program of recognizing the ambient status of said drawing to be recognized, changing said recognition agents assigned to said drawing to be recognized under control of a supervisor agent when a problem that the adjacent relation of said recognition agents is contradicted arises, and predicting a line path at a portion where a line path is connected to another line path during tracing of line paths of said drawing to be recognized by said recognition agents by making the recognition agent on the line path adjacent to said line path cooperate under control of said supervisor agent; and a registration program of registering the result obtained by execution of said recognition program as drawing data.

2. A drawing registration method comprising the steps of:

reading a drawing as image data and displaying it on a display screen;

selecting line images to be processed;

assigning recognition agents to said selected line images;

tracing said line images in parallel;

changing said recognition agents under control of a superviosr agent and referring to a trace result of another recognized line image when a line image being traced is connected to another line images;

predicting a line path at a poriton where the lime image is connected to another line path during tracing of said line images recognized by said recognition agents by making the recognition agent on the line path adjacent to said line path cooperate under control of said supervisor agent;

recognizing that said connected part is positioned so as to hold the adjacent relation with said line image; and registering the result of the recognizing step as data indicating said drawing.

3. A drawing registration method comprising the steps of:

displaying an image of a drawing to be registered on a display screen;

designating drawings to be registered and a range within which said drawings to be registered exist on said display screen;

setting a recognition agent for recognizing a drawing in each of said drawings to be registered within said designated range; and recognizing and registering the line path information of drawings within said range by using a supervisor agent for controlling each recognition agent so as to recognize said line path using the information of recognized line paths when said recognition agent traces line paths of the corresponding drawing in parallel and said line paths are not decided uniquely due to a connection with a neighboring line path.

4. A drawing registration method according to claim 3, wherein said recognition agent is set for each drawing by designating a plurality of drawings sequentially on said display screen.

5. A drawing registration apparatus using a line recognizing method on the basis of path tracing with vector data as an object to be recognized, comprising display means for displaying a line image to be recognized, instruction means for designating the start position and range of a plurality of adjacent line images to be traced from the outside, a memory having an area of storing a recognition program for controlling path tracing of said line images from said designated position and an area of storing recognized line image data, and control means for controlling the operation of the entire apparatus, wherein said control means refers to path information of recognized adjacent line images even when the tracing direction is not decided uniquely due to a connection with a neighboring line image, by tracing paths of a plurality of line images in parallel from said start position according to said recognition program, predicts said path which is not decided uniquely, decides as optimum tracing direction using a cost function defined on the basis of the position relation between said predicted path and said tracing direction, and controls so that line image data corresponding to drawing data is registered in the memory.

6. A drawing registration apparatus according to claim 5, wherein when said recognition program is executed, in a recognition agent for tracing paths assigned in correspondence to each of a plurality of adjacent line images which are to be traced as designated by said instruction means and a supervisor agent for supervising said path recognition agents, parallel path tracing is formulated by describing an autonomous action of each agent and a cooperative action between said recognition agents.

7. A drawing registration apparatus according to claim 6, wherein when said tracing direction is not decided uniquely, said recognition agent obtains path information from a recognition agent in the adjacent relation with said recognition agent, predicts a path in a location where said tracing direction is not decided uniquely from the path information of the already recognized adjacent line, and decides an optimum tracing direction using said cost function.

8. A figure recognizing method comprising the steps of:

displaying an image of a figure to be recognized; instructing a recognition object and range by an operator;

assigning (initial assignment) a recognition agent to each of line paths constituting said figure on the basis of local criteria of said line paths;

setting a supervisor agent for recognizing the ambient status when a problem arises;

predicting a line path by making the adjacent recognition agent cooperate under control of said supervisor agent when a problem arises that the line path of said recognition agent is not decided at a junction part; and recognizing the data possessed by the finally remaining recognition agent as a figure.

9. A figure recognizing method according to claim 8, wherein when a recognition agent is assigned to each of said line paths on the basis of said local criteria, an ellipse area with the trace point on a line path and a point on the extension line of said line path as focuses is set as a tracing area.

10. A figure recognizing method according to claim 8, wherein the connection condition is decided using a cost function for indicating the smoothness of a line.

11. A figure recognizing method according to claim 8, wherein line paths are classified by using distance/path length between start and terminal points, total sum of vector lengths/path length, and path length which are defined in correspondence to line paths recognized on the basis of the local connectivity at least as feature measurements, and line paths corresponding to the recognition object instructed by an operator are extracted, and at least one recognition agent is assigned in correspondence to each of said extracted line paths.

12. A figure recognizing method according to claim 11, wherein a range of said feature measurements of line paths is instructed by an operator and line paths corresponding to said range of feature measurements are colored and displayed.

13. A figure recognizing method according to claim 8, wherein when a contradiction is generated in the adjacent relation between recognition agents tracing a figure or line paths of recognition agents are not fixed, recognition agents adjacent to a recognition agent whose line path is not fixed are grouped, and a supervisor agent is set in correspondence to said group, and said supervisor agent controls cooperation and competition of said plurality of grouped recognition agents.

14. A figure recognizing method according to claim 13, wherein when a competition is generated between said plurality of grouped recognition agents, said supervisor agent controls so that one recognition agent is assigned in correspondence to one line path finally.

* * * * *